United States Patent
Kory

(10) Patent No.: US 8,303,123 B2
(45) Date of Patent: Nov. 6, 2012

(54) STEREOSCOPIC KALEIDOSCOPE AND 3D VIEWER

(76) Inventor: Michael Kory, Malibu, CA (US)

( * ) Notice: Subject to any disclaimer, the term of this patent is extended or adjusted under 35 U.S.C. 154(b) by 0 days.

(21) Appl. No.: 13/173,988

(22) Filed: Jun. 30, 2011

(65) Prior Publication Data

US 2011/0261452 A1    Oct. 27, 2011

Related U.S. Application Data

(63) Continuation-in-part of application No. 13/014,687, filed on Jan. 26, 2011.

(60) Provisional application No. 61/298,358, filed on Jan. 26, 2010.

(51) Int. Cl.
G02B 27/08 (2006.01)
(52) U.S. Cl. ........................ 359/616; 359/617
(58) Field of Classification Search .......... 359/616–617; D21/403
See application file for complete search history.

(56) References Cited

U.S. PATENT DOCUMENTS

| | | | |
|---|---|---|---|
| 3,011,392 A * | 12/1961 | Prochazka | 359/617 |
| 3,039,356 A * | 6/1962 | Knittel | 359/617 |
| 3,111,878 A * | 11/1963 | Welles et al. | 359/617 |
| 4,731,666 A | 3/1988 | Csesznegi | |
| 4,820,004 A | 4/1989 | Briskin | |
| 4,998,799 A | 3/1991 | Brown | |
| 5,020,870 A * | 6/1991 | Gray | 359/616 |
| 5,475,532 A | 12/1995 | Sandoval et al. | |
| 6,062,698 A | 5/2000 | Lykens | |
| 7,399,083 B2 | 7/2008 | Bailey et al. | |
| 7,900,384 B2 * | 3/2011 | Schnuckle | 40/324 |
| 2004/0032662 A1 * | 2/2004 | Hattori et al. | 359/616 |
| 2007/0223099 A1 * | 9/2007 | Bailey et al. | 359/616 |
| 2007/0252953 A1 * | 11/2007 | Metzger et al. | 353/7 |
| 2010/0277575 A1 * | 11/2010 | Ismael et al. | 348/53 |

* cited by examiner

Primary Examiner — Clayton E Laballe
Assistant Examiner — Kevin Butler
(74) Attorney, Agent, or Firm — Huntsman Law Group, PLLC; Robert A. Huntsman

(57) ABSTRACT

A stereoscopic 3D viewer used in conjunction with a portable computing device displaying a pair of stereoscopically complementary images. In an improved stereoscopic 3D viewer, the pair of stereoscopically complementary images enter the and right eyes of the user along substantially parallel paths, to eliminate or substantially reduce the need for the user to cross his or her eyes and to improve focus and sharpness of the images. In additional embodiments of the improved stereoscopic 3D viewer, baffles are provided to block the extraneous direct view of the pair of stereoscopically complementary images.

13 Claims, 17 Drawing Sheets

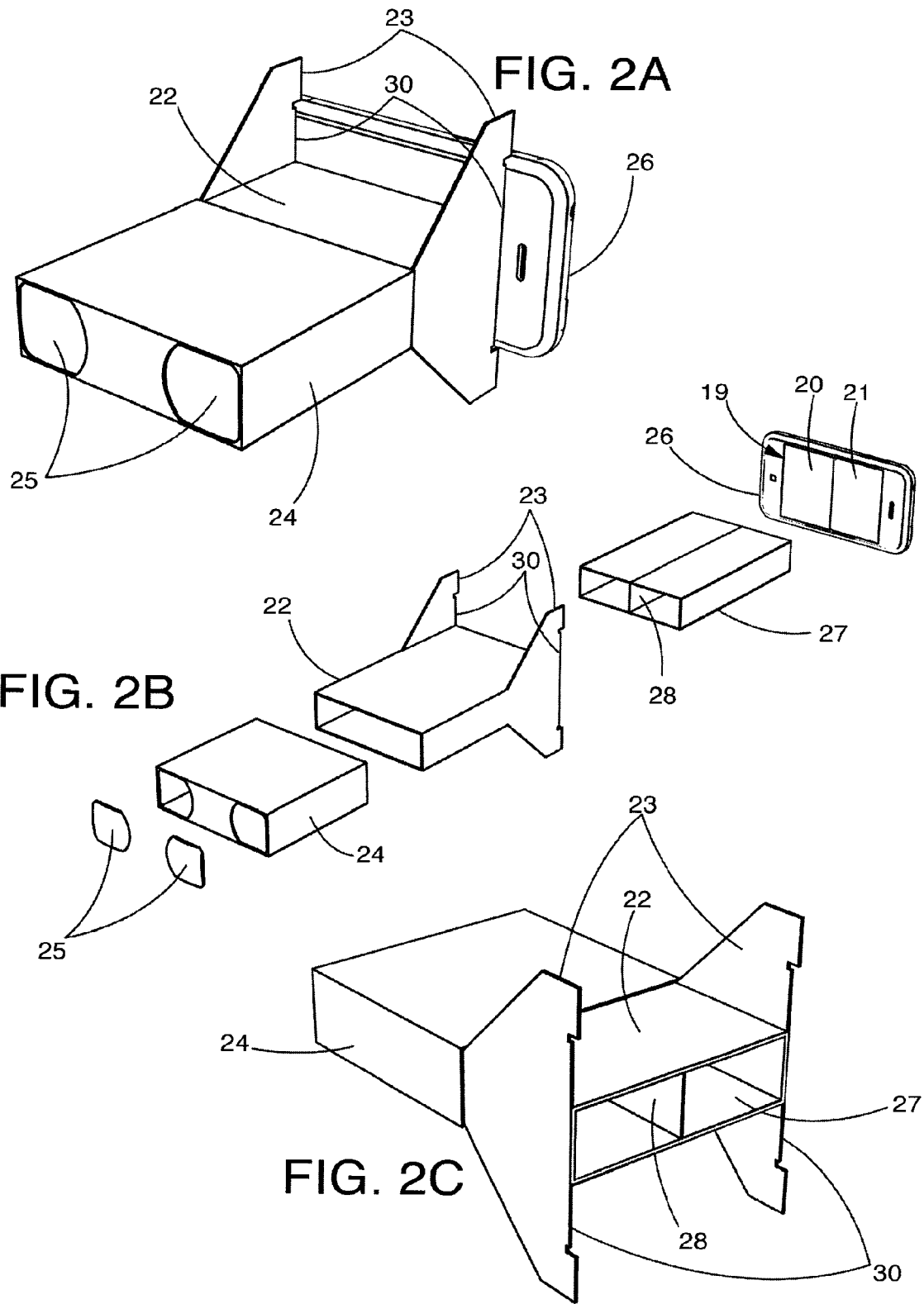

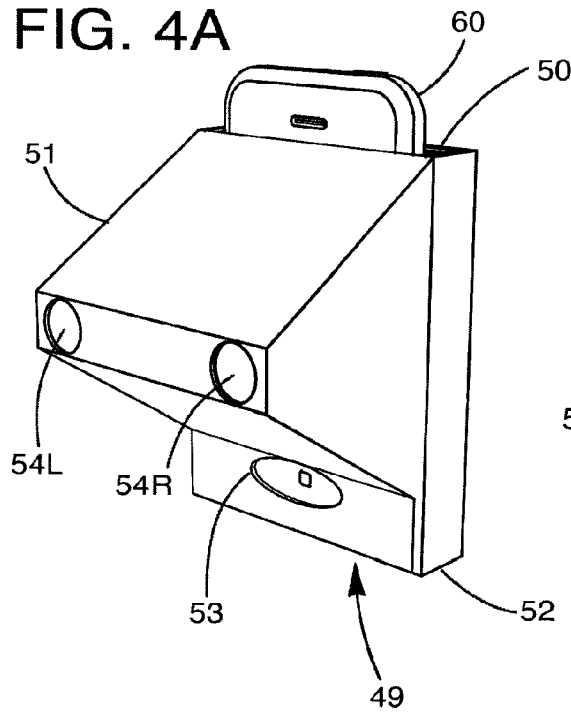
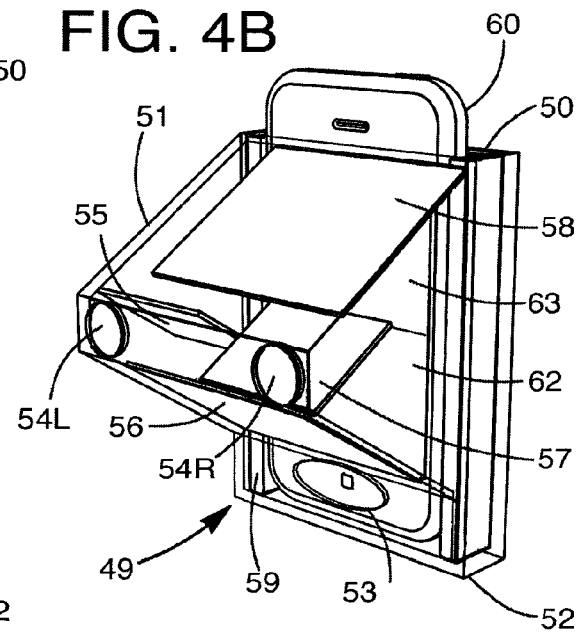
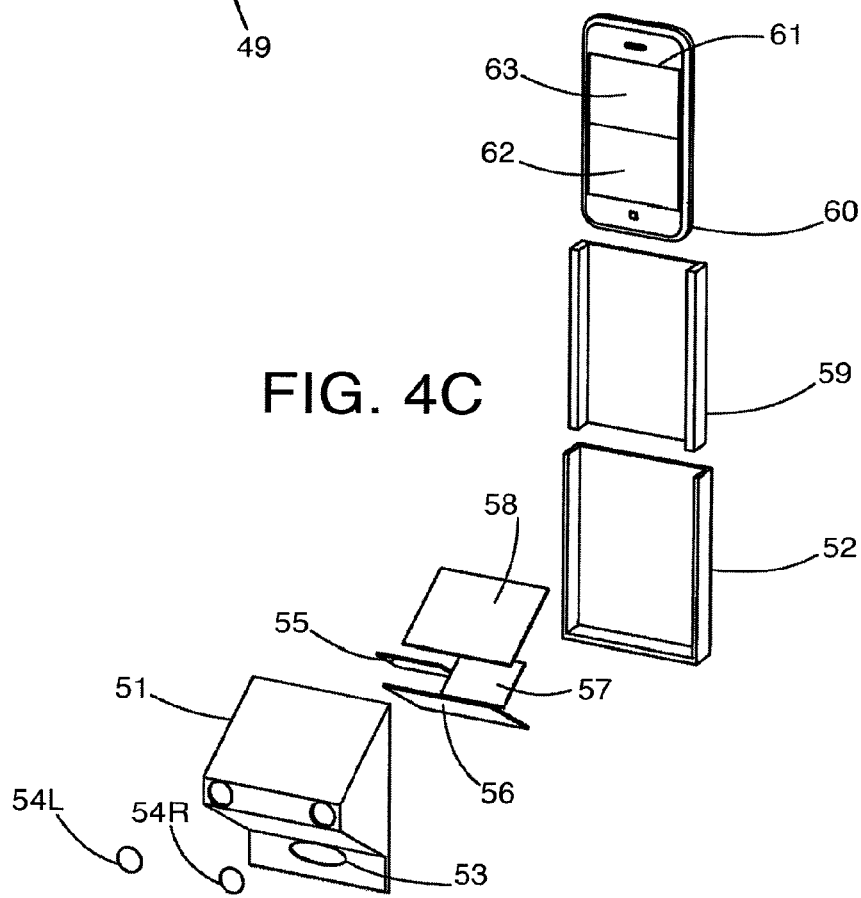

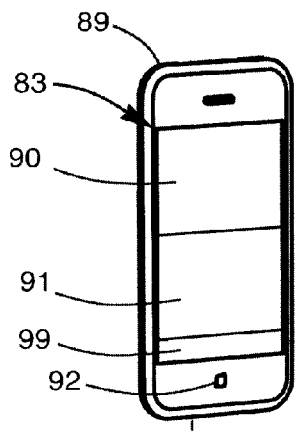
FIG. 5A
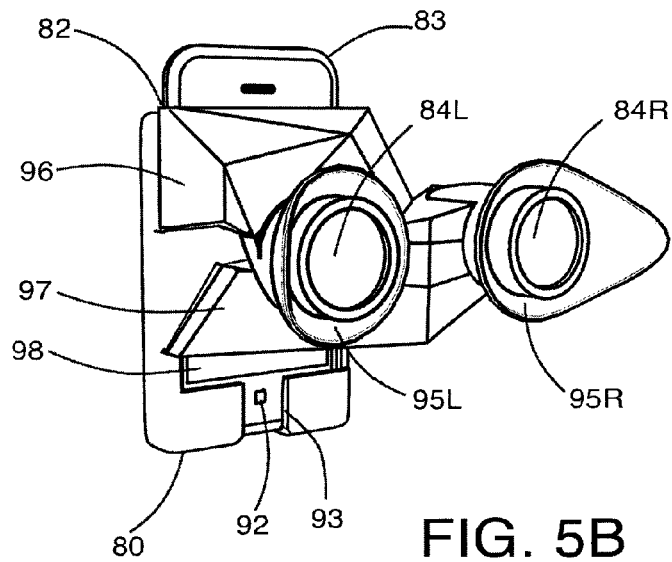
FIG. 5B
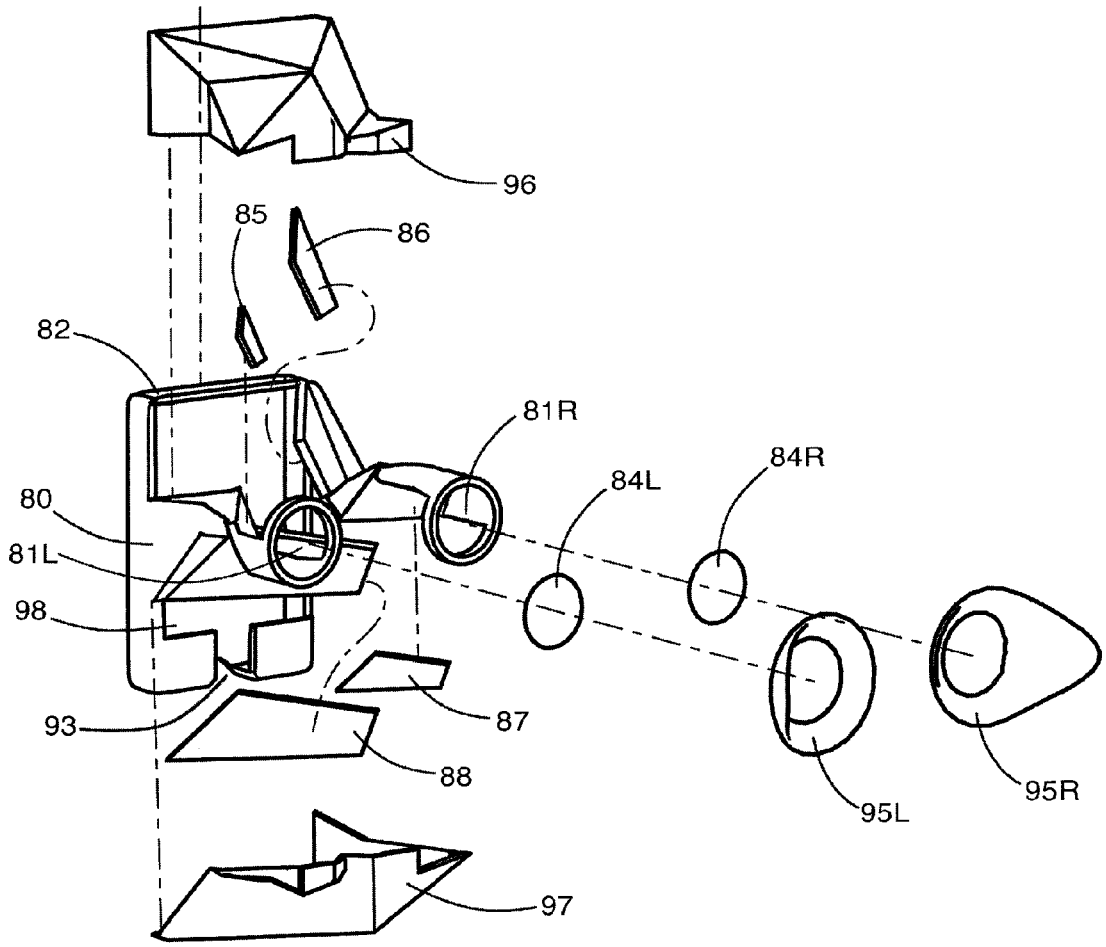

STEREOSCOPIC KALEIDOSCOPE AND 3D VIEWER

This patent application is a continuation-in-part of U.S. patent application Ser. No. 13/014,687, filed on Jan. 26, 2011, titled STEREOSCOPIC KALEIDOSCOPE AND 3D VIEWER, and claims priority therefrom. U.S. patent application Ser. No. 13/014,687 in turn claims priority from U.S. Provisional Patent Application No. 61/298,358, filed on Jan. 26, 2010.

TECHNICAL FIELD

The following relates to kaleidoscopes, specifically to stereoscopic kaleidoscopes and viewers.

BACKGROUND

Since it was invented by Sir David Brewster in 1815, the kaleidoscope has continued to fascinate generation after generation of children and adults. The ability to peer into the eyepiece of a simple and small device and discover and manipulate a seemingly endless field of ever-changing symmetrical patterns is something that has always had widespread appeal.

In its most basic form, the kaleidoscope consists of a tube encasing three elongated mirrors creating a triangular column. One end of the column forms an object window abutting a transparent rotating chamber containing an assortment of colorful bits of plastic or glass; this serves as the source material to be viewed and reflected. The other end of the column serves as the eyepiece. When viewed through the eyepiece, the triangular aperture of the object window affords a direct view of the source material behind it, and the surrounding mirrors produce a repeating pattern of multiple reflections of that image. The direct view and the reflections of it combine to produce a field of patterns extending to the edges of peripheral vision. However, since only one eye is afforded this view, the imagery produced is flat, or two-dimensional.

Several binocular kaleidoscopes in the prior art have introduced binocular viewing into kaleidoscope design. The term "binocular" however only refers to the use of both eyes, and does not necessarily imply stereopsis, or the sensation of depth. If a viewer uses both eyes to view essentially flat subject matter such as a photograph of a car, the amount of depth perceived is obviously limited in comparison to looking at the actual car. The more depth the subject matter has, the more parallax—i.e., the difference in the perceived position of a 3D object when viewed by the left vs. the right eye—there is, and the more depth that can be perceived. Of the previous binocular kaleidoscopes in the prior art none take full advantage of the possibilities of stereopsis.

In the case of U.S. Pat. No. 4,820,004 (Briskin), no mention is made of dimensional source material, no lenses are suggested to aid in focusing, no claims are made for stereopsis, and little would be possible because of the greatly reduced parallax inherent in the design. In the case of U.S. Pat. No. 5,020,870 (Gray), the source material on the disks or dishes suggested is either essentially flat or are not deep enough to introduce parallax, consequently only the internal reflections would provide any stereopsis. In the case of U.S. Pat. No. 5,475,532 (Sandoval et al.), no lenses are suggested to aid in focusing, and the arrangement of mirrors and windows allows for stereopsis only in a version large enough to be able to view through a single window with both eyes, necessitating a substantially larger and unwieldy device, and any subsequent stereopsis would be almost entirely comprised of the internal reflections as opposed to imagery framed by the windows. In the case of Int. Pat. No. 03/083516 (Wallach), no lenses are suggested to aid in focusing, and the only source material suggested are either a flat disk or a flat container, eliminating the possibility of significant parallax. In addition, the arrangement of two triangular cross-sectioned eye channels at an angle to one another could only produce stereopsis in a limited, harlequin-patterned portion of reflections covering only one third of the total viewing area.

In addition, these binocular kaleidoscopes all rely on physical objects as the source material to be reflected. Another possibility unexplored by them is to utilize stereoscopic imagery or video as the source material.

Several video kaleidoscopes in the prior art have been proposed, namely: U.S. Pat. No. 4,731,666 (Csesznegi); U.S. Pat. No. 6,062,698 (Lykens); and U.S. Pat. No. 7,399,083 (Bailey et al.). However, these are monocular and/or do not utilize stereoscopic source material, and therefore cannot produce stereoscopic patterns based on the source material.

Thus advantages of one or more aspects of the present invention are to incorporate source material providing sufficient parallax for significant stereopsis, and stereo viewing of both that source material and its internal reflections covering the entire foveal or central region of vision. In addition to stereopsis, an advantage of binocular viewing over monocular viewing is that small children have difficulty viewing material with one eye rather than two. Other advantages of one or more aspects are to provide for a device that is small, portable, handheld, simple, and inexpensive to manufacture. These and other advantages of one or more aspects will become apparent from a consideration of the ensuing description and accompanying drawings.

SUMMARY

The primary objective of the stereoscopic kaleidoscope described herein is to improve on the visual experience associated with kaleidoscopes by giving it depth and making it more immersive.

This is achieved by means of a mirror chamber consisting of two or more inwardly reflecting mirrored surfaces lining the interior of a viewing apparatus. This chamber opens to an object window at one end, and the opposing end houses two eyepiece lenses.

In one embodiment utilizing physical materials such as beads as the source material, the entire viewing field allows for stereopsis. In another embodiment utilizing stereoscopic video as the source, the central vertical column of reflections occupying the field of vision most sensitive to stereopsis will be entirely correct (as will every other column of reflections to either side of the central column). Adjacent alternating columns of reflections will have reverse stereopsis (near and far portions of the image will be reversed), although these columns will appear in peripheral vision, which is not sensitive to stereopsis; consequently, this will not be noticeable while viewing straight ahead.

In an embodiment utilizing physical materials, the source material can consist of objects such as glass or plastic beads, small broken bits of colored glass, sequins, and/or glitter. These materials are contained in a transparent chamber that may or may not be divided into a series of compartments. The materials can freely move about either dry or suspended in a transparent clear or colored liquid such as water, oil or glycerin. One or more compartments filled with multiple non-mixing insoluble colored liquids may be incorporated, with or without bits of material suspended in them. Compartments without any material in them can also be utilized to serve as dividers or gaps that provide greater depth and separation between those compartments that are filled. The chamber can be physically manipulated, such as being shaken, tilted or rotated, and the material in the chamber can tumble and fall, constantly altering the orientation and physical arrangement of the material observed through the object window.

In another embodiment utilizing stereoscopic video as the source, the mirror box is separated into two channels, one for each eye, with a two-sided mirror as a divider running from between the eyepiece lenses to the object window. This divider prevents one eye from viewing the image intended for the opposite eye. The source material in this embodiment is side-by-side left and right eye parallel-view stereoscopic video or computer generated imagery. The boundaries of the object window's openings correspond to the boundaries of the images.

The stereoscopic video kaleidoscope described herein may also be adapted for use as a stereoscopic 3D viewer. In one embodiment, a stereoscopic 3D viewer is provided for viewing a stereoscopic image having a left side and a right side in a parallel-view format. In another embodiment, a stereoscopic 3D viewer is provided for viewing a stereoscopic image formatted in an over and under manner into top and bottom halves.

An improved stereoscopic 3D viewer utilizing over/under formatted stereoscopic images and/or video, according to certain embodiments of the present invention, displays one or more stereoscopically complementary image pairs such that the respective images intended for the left and right eyes of the user respectively enter the left and right eyes along substantially parallel optical paths. In other embodiments of the improved stereoscopic 3D viewer, one or more baffles are incorporated as part of the optical paths to block the extraneous direct view of the screen by the left and/or right eyes.

Focus adjustments can be provided to accommodate users with varying visual acuity. Adjustments to inter-ocular spacing can also be made to accommodate a wider range of users.

A stereoscopic 3D viewer can additionally be provided with straps or other means of mounting it on a user's head or headgear as to position the viewer before the user's eyes without requiring the user to use his or her hands to hold the viewer. Sensors in the video playback device, such as a compass, accelerometer, gyroscope and/or GPS could track the position, movement and orientation of the user's head and correspondingly update the stereoscopic imagery displayed in real time. This allows the user to use the stereoscopic 3D viewer as virtual reality goggles.

Many other aspects and examples will become apparent from the following disclosure.

BRIEF DESCRIPTION OF THE DRAWINGS

FIG. 2A is a perspective view from the front of an embodiment of a stereoscopic kaleidoscope utilizing stereoscopic video as source material.

FIG. 2B is an exploded view of an embodiment of a stereoscopic kaleidoscope utilizing stereoscopic video as source material.

FIG. 2C is a perspective view from the rear of an embodiment of a stereoscopic kaleidoscope utilizing stereoscopic video as source material.

FIG. 4A is a perspective view of an embodiment of a stereoscopic 3D viewer utilizing over/under formatted stereoscopic video.

FIG. 4B is a perspective cutaway view of an embodiment of a stereoscopic 3D viewer utilizing over/under formatted stereoscopic video.

FIG. 4C is an exploded view of an embodiment of a stereoscopic 3D viewer utilizing over/under formatted stereoscopic video.

FIG. 5A is an exploded view of an improved stereoscopic 3D viewer utilizing over/under formatted stereoscopic imagery according to one embodiment of the present invention.

FIG. 5B is a perspective view of the improved stereoscopic 3D viewer illustrated in FIG. 5A.

DETAILED DESCRIPTION

Figure 1A:
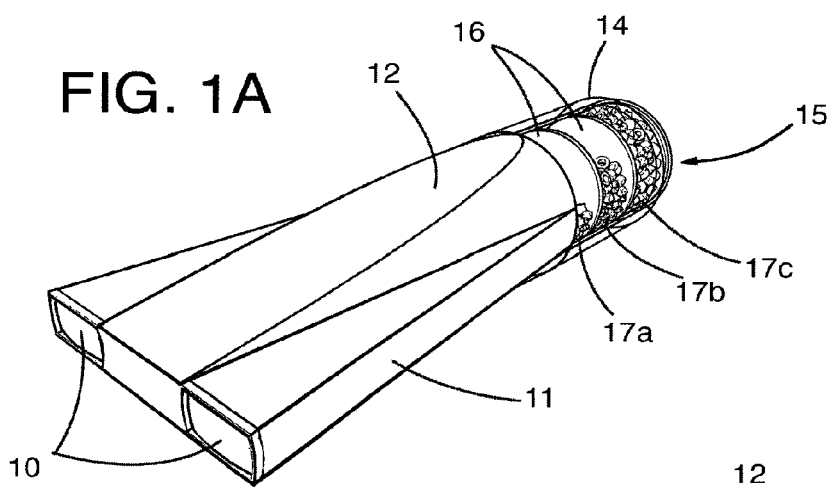
FIG. 1A is a perspective view from the front of an embodiment of a stereoscopic kaleidoscope utilizing physical objects as source material.
Figure 1B:
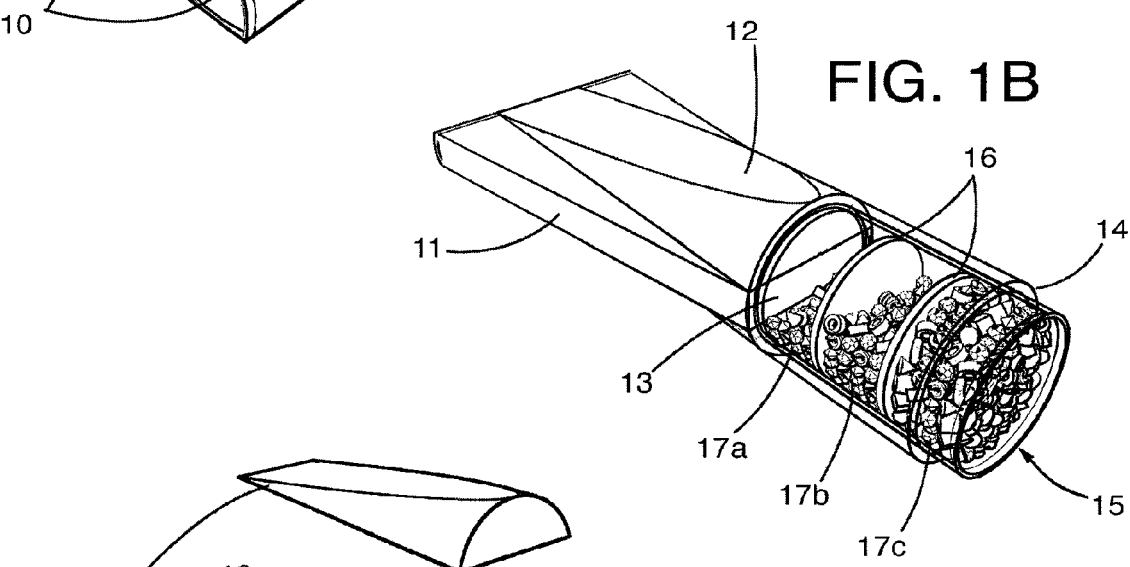
FIG. 1B is a perspective view from the rear of an embodiment of a stereoscopic kaleidoscope utilizing physical objects as source material.
Figure 1C:
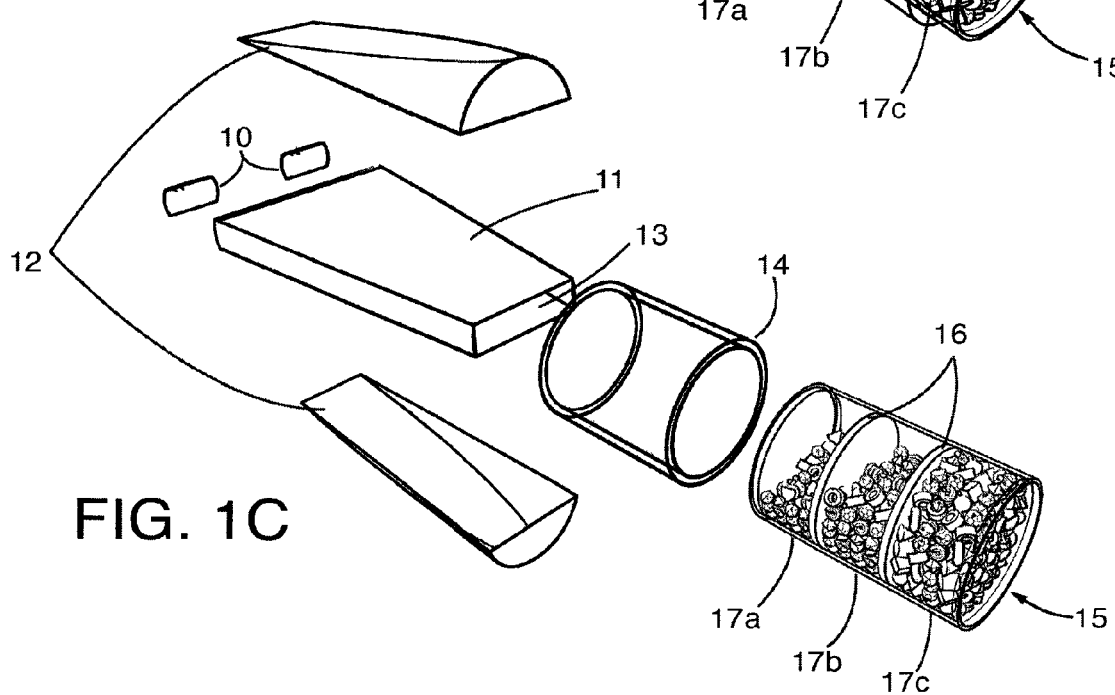
FIG. 1C is an exploded view of an embodiment of a stereoscopic kaleidoscope utilizing with physical objects as source material.

One embodiment of the stereoscopic kaleidoscope utilizing physical objects for source material is illustrated in FIGS. 1A-1F. A mirror box 11 is comprised of four inward reflecting planar mirrored surfaces. At the viewing end of the mirror box 11, the top and bottom surfaces should be wide enough so as not to impede the viewer's peripheral view of the interior reflections. The top and bottom surfaces preferably form trapezoids, converging to a narrower width at an opening 13, which forms an object window. The mirror box 11 can be assembled from four separate reflective surfaces, preferably first surface mirrors, or from a single molded or vacuum formed plastic box that has a mirrorized interior. The top and bottom of mirror box 11 can either be parallel or at a slight angle to the horizontal to one another. Affixed to the mirror box 11 in front of the object window 13 is a transparent cylindrical tube or collar 14, preferably made out of plastic. The diameter of the interior walls of the collar 14 is the same as or wider than the width of the object window 13.

A source material chamber 15 is a cylindrical tube, capped or sealed at both ends, preferably made out of transparent plastic. The interior of the chamber 15 forms a single compartment, or has clear dividers 16, preferably made out of plastic, which separate the interior into two or more compartments, 17a, 17b, and 17c.

Figure 1D:
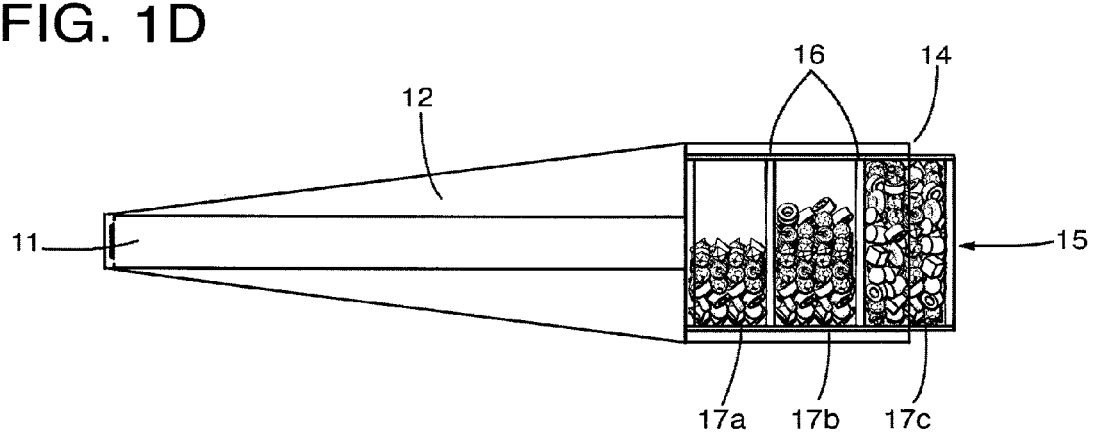
FIG. 1D is a side plan view of an embodiment of a stereoscopic kaleidoscope utilizing physical objects as source material.
Figure 1E:
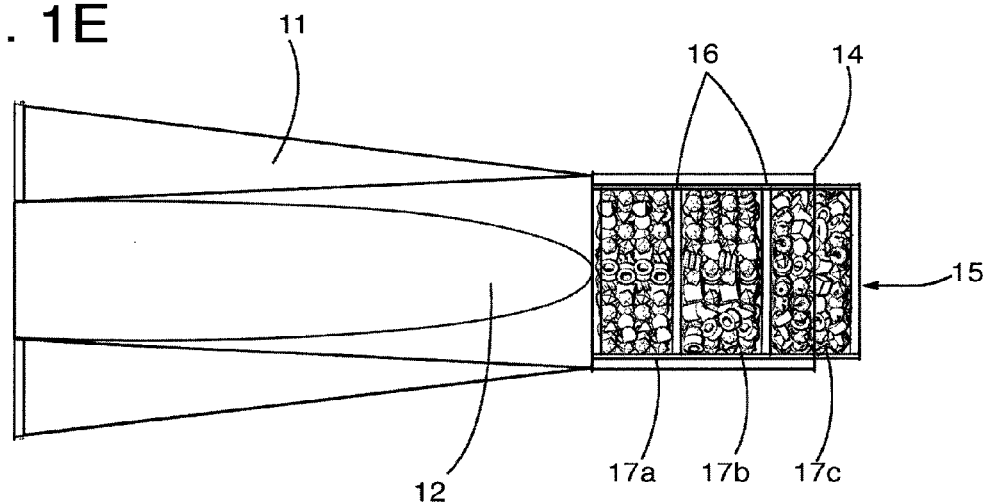
FIG. 1E is a top plan view of an embodiment of a stereoscopic kaleidoscope utilizing physical objects as source material.
Figure 1F:
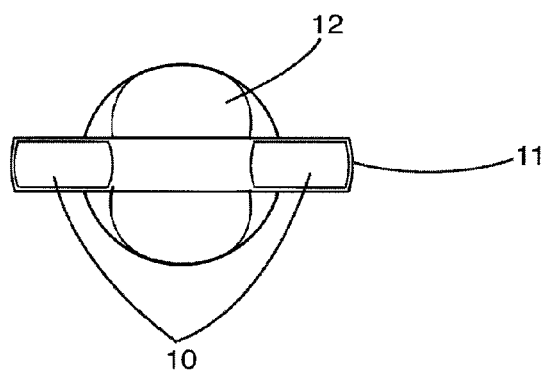
FIG. 1F is a front plan view of an embodiment of a stereoscopic kaleidoscope utilizing physical objects as source material.
Figure 3A:
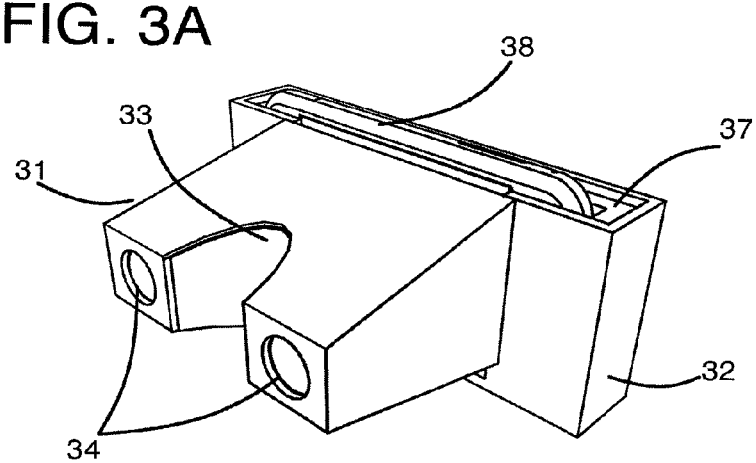
FIG. 3A is a perspective view from above of the front of an embodiment of a stereoscopic 3D viewer utilizing side-by-side parallel-view formatted stereoscopic video.
Figure 3B:
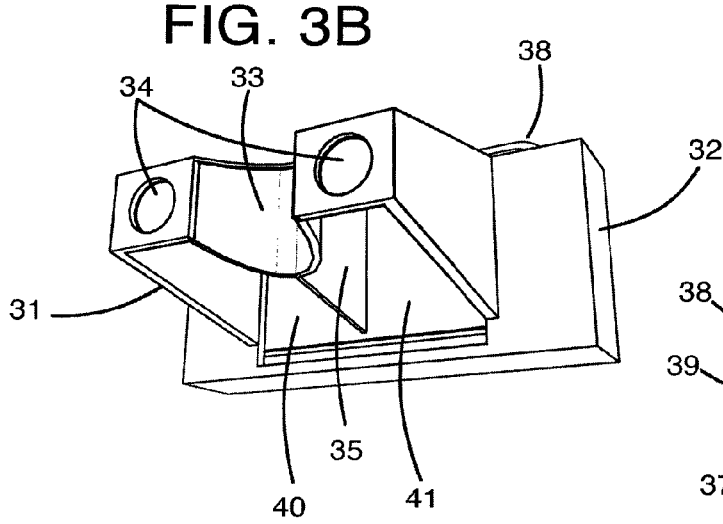
FIG. 3B is a perspective view from below of the front of an embodiment of a stereoscopic 3D viewer utilizing side-by-side parallel-view formatted stereoscopic video.
Figure 3C:
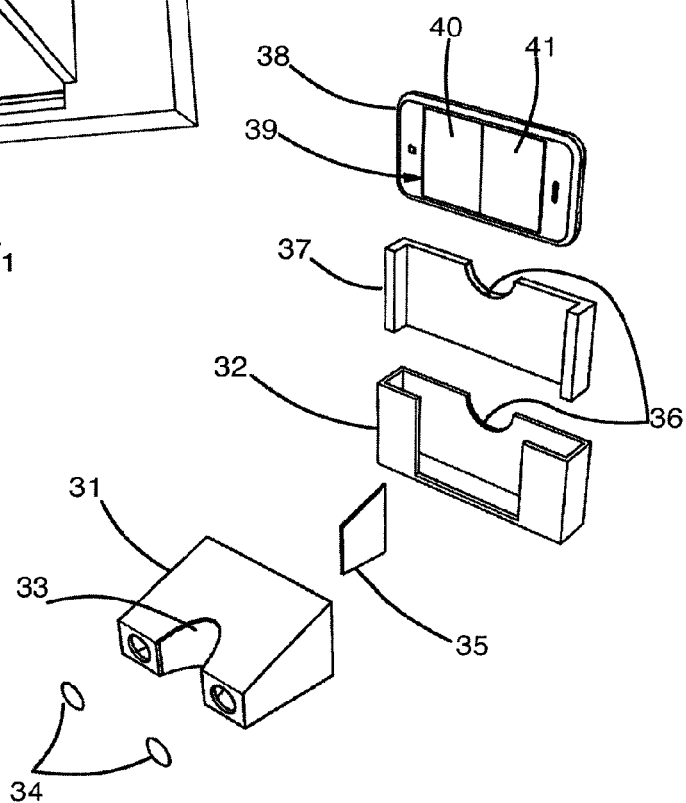
FIG. 3C is an exploded view of an embodiment of a stereoscopic 3D viewer utilizing side-by-side parallel-view formatted stereoscopic video.
Figure 3D:
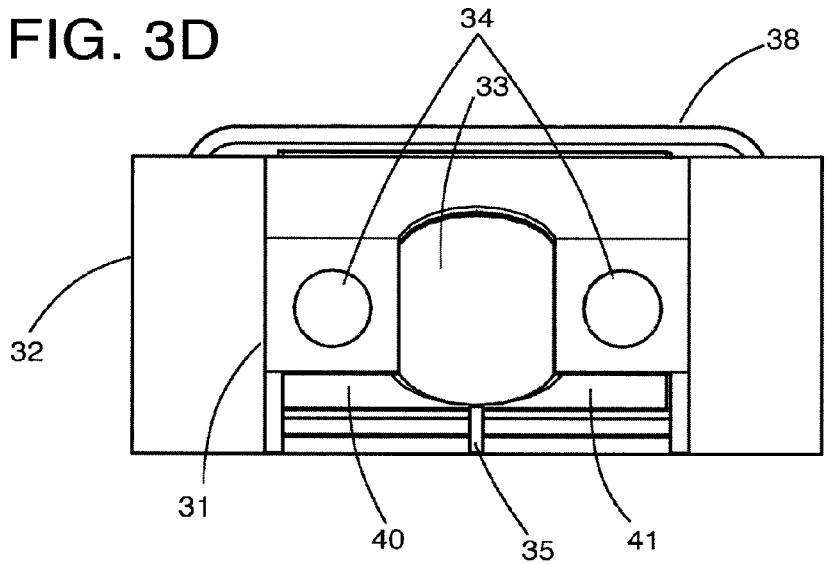
FIG. 3D is a front plan view of an embodiment of a stereoscopic 3D viewer utilizing side-by-side parallel-view formatted stereoscopic video.
Figure 3E:
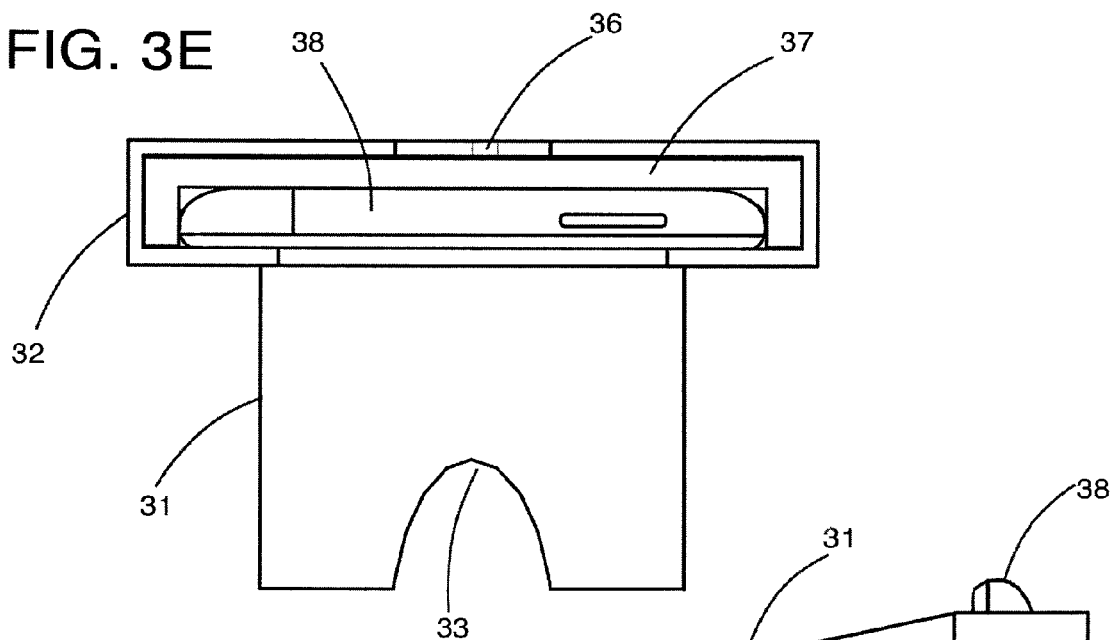
FIG. 3E is a top plan view of an embodiment of a stereoscopic 3D viewer utilizing side-by-side parallel-view formatted stereoscopic video.
Figure 3F:
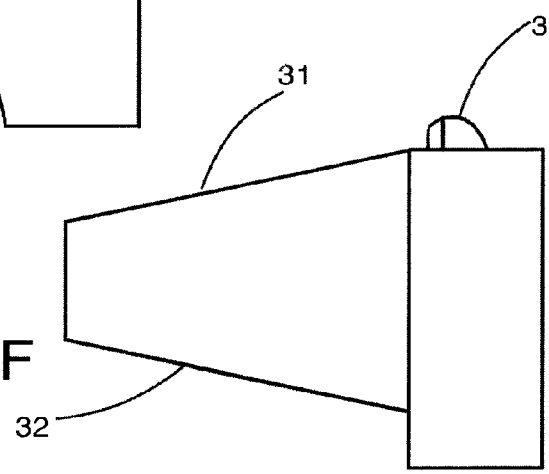
FIG. 3F is a side plan view of an embodiment of a stereoscopic 3D viewer utilizing side-by-side parallel-view formatted stereoscopic video.

The exterior diameter of chamber 15 is slightly less than that of the interior diameter of collar 14 so as to rotate freely when inserted. A portion of chamber 15 is exposed so as to allow manual rotation of it by the user. This can be accomplished by having chamber 15 extend beyond the length of collar 14 as shown in FIGS. 1D & 1E, in which case it can be retained by a lip on the interior of the end of collar 14 and a corresponding groove on the exterior of chamber 15. Alternately, collar 14 can entirely enclose chamber 15 and be capped, in which case collar 14 can have openings in it on opposing sides large enough to allow for manipulation of chamber 15 with a thumb and fingers.

Compartments 17a, 17b, and 17c are filled with an assortment of beads, sequins, glitter, colored non-soluble non-mixing liquids, or other small bits of material which can freely move about when the chamber 15 is manipulated by the user. These objects can reside dry in the compartments 17a, 17b, and 17c or be suspended in clear or colored transparent liquids such as water, oil or glycerin. As shown in side view FIG. 1D, when multiple compartments are filled with objects that are not transparent enough to allow for sufficient viewing through them to the materials in end compartment 17c, the compartment 17a closest to object window 13 is filled with the least amount of material, and subsequent chambers are filled with progressively greater amounts of material, culminating in the end compartment 17c which is filled with the greatest amount of material.

Viewing lenses 10 aid in focusing on the materials in the chamber 15 and are preferably made out of optically transparent plastic. The viewing lenses 10 preferably have a focal length such that their optimum focus point resides at or just beyond the object window 13, and should be far enough apart and of a sufficient diameter so as to accommodate a range of inter-ocular distances from children to adults. Top and bottom housings 12 are affixed to the mirror box 11 so as to support the collar 14.

Another embodiment of the stereoscopic kaleidoscope can incorporate a motor assembly, controlled by one or more buttons or a toggle button or switch, which can rotate the chamber 15 in either a clockwise or counter-clockwise direction according to which button is pressed. The button or buttons can be pressure sensitive so that increasing the pressure applied will increase the speed of the rotation. The motor can rotate chamber 15 by means of friction applied by a wheel in contact with it, preferably made out of rubber, or by a geared wheel, which could engage corresponding gears around chamber 15's outer perimeter.

The stereoscopic kaleidoscope can feature a much longer source material chamber 15 than illustrated in the figures to provide greater separation between compartments and an increased perception of depth. In this case the chamber could be conical rather than cylindrical with a wider diameter at the end opposite the object window, so as to ensure that all of the chambers, including those farthest away from the viewer, cover the entire field of view.

Yet another embodiment of the stereoscopic kaleidoscope can incorporate lighting elements such as LED lights into either the source material chamber or into the interior of the mirror box. These lights could flash or change colors in a pre-programmed sequence. In the mirror box, LEDs could be arranged spaced closely together in rows lining the four corners and/or along a rod positioned in the center of the box from the object window to between the eyepiece lenses. The LEDs can be programmed to fire in sequence so as to produce an animated effect simulating motion, especially motion toward or away from the viewer.

A further embodiment of the stereoscopic kaleidoscope can incorporate another object or source material compartment in the interior of the mirror box, separated from the source material chamber 15. Slots could be cut in the top and bottom of the mirror box to accommodate this compartment. This compartment could be attached to the source material chamber 15 by means of a rod through its center so it would rotate with the others.

The stereoscopic kaleidoscope can feature mechanism whereby chamber 15 can move towards and away from the viewer, preferably oscillating back and forth as it is rotated.

In one embodiment of the stereoscopic kaleidoscope, the source material chamber 15 can feature an "infinity mirror." The chamber 15 would have a reflective surface, preferably a first surface mirror, at its back facing the viewer, a two-way mirror at its front closest to the object window 13, and be filled with fluorescent colored objects such as beads. These beads could be illuminated by one or more UV LEDs around its perimeter.

In another embodiment the stereoscopic kaleidoscope, the top and bottom mirrors of the mirror box could be hinged where they form the object window instead of fixed so they could assume a variety of angles with respect to one another. This results in the apparent shape of the reflections created changing from a straight vertical wall when the mirrors are parallel, to a curved surface bowing away from the viewer at the object window when the mirrors are angled with a greater separation at the eyepiece lens side. A mechanism, for example, incorporating rods and gears could link the manual rotation of the source material chamber to an oscillating variation of angles so that the apparent shape of the reflections changes over time.

Another embodiment of the stereoscopic kaleidoscope utilizes stereoscopic video as source material and is illustrated in FIGS. 2A-2C. A mirror box 27 seen in FIGS. 2B and 2C is comprised of four inward reflecting planar mirrored surfaces, preferably first surface mirrors. An eyepiece divider 28 bisects and runs the length of the mirror box 27, and has outward reflecting mirror surfaces on both sides. The mirror box 27 is rectilinear, and the length and height of the openings correspond to the exact dimensions of the video material. The mirror box 27 is contained with housing 22, which incorporates panels 23. These panels 23 have indentations 30 which correspond to the narrower outer dimensions of the front of a handheld video playback and computing device 26, such as Apple's iPhone®, in order to allow for correct vertical positioning, alignment and stabilization with it. The user can visually align the sides of the stereoscopic kaleidoscope horizontally to the video screen 29 on the handheld video playback and computing device 26. A lens box 24 slides over housing 22 and is loose enough to allow for repositioning for focus adjustments but tight enough so as not to fall off. The viewing lenses 25 have a focal length focal length sufficient so that their optimum focus point resides at the screen of the handheld video playback and computing device 26.

The housing 22 and the lens box 24 can be made out of various materials such as injection modeled plastic, plastic sheeting, or folded cardboard. The panels 23 can have pre-scored removable notches at regular intervals on either side of the indentations 30 so as to allow the user to increase the size of the indentations 30 to allow for alignment with a variety of widths of handheld video playback and computing devices.

Stereoscopic imagery is formatted for the handheld video playback and computing device 26 in side-by-side, parallel-view format. Parallel-view refers to the placement of the left image on the left side of the screen and the right image on the right side of the screen. The two images are of the same scene but are from two slightly different points of view, and are displayed on video screen 19, as shown in FIG. 2B. The first image, indicated by the reference numeral 20, shows a scene from a left eye's point of view. The second image, indicated by the reference numeral 21, shows the same scene from a right eye's point of view. The amount of distance between these two points of view typically corresponds roughly to the average inter-ocular distance, but can be exaggerated to increase parallax and thus the stereoscopic effect.

The material viewed can include a wide variety of pre-existing stereoscopic content, or be generated in real time, in which case the viewer could interact with the imagery produced by software in a variety of fashions, including pushing buttons, interacting with a touch screen, making noise, or tilting, rotating, or shaking a device that has an accelerometer and/or a compass. In addition, the user's physical location and orientation could be tracked by accelerometer, compass, and/or GPS in the device. The software could respond to this input by changing the program or by altering visual aspects of the imagery such as position, size, color, shape, speed, frequency, or apparent depth.

Another embodiment of the stereoscopic video kaleidoscope may be provided with horizontal panels in addition to vertical panels 23, incorporating indentations that correspond to the wider outer dimensions of the front of the handheld video playback and computing device 26 so that the user does not have to align the two visually. Or instead of panels, a container or other holder can be provided to maintain the video playback device 26 such that it is aligned with the mirror box 27 and such that the user does not have to hold it separately.

The stereoscopic video kaleidoscope described herein may also be adapted for use as a stereoscopic 3D viewer.

One embodiment of the 3D hand-held video viewer is illustrated in FIGS. 3A-3F and is used with side-by-side parallel-view formatted stereoscopic imagery. Viewing chamber 31 houses eyepiece lenses 34 at the front end and is open at the back and on the bottom. Attached to the viewing chamber 31 is a holder 32 with an opening at the top into which a hand-held video playback and computing device 38 such as Apple's iPhone® can slide. A shell 37, preferably made out of foam rubber, lines the sides and back of the holder 32 so as to seat the hand-held device 38 snuggly and center its alignment to the eyepiece lenses 34, and also allow for a variety of devices with differing dimensions to be accommodated. Thumb notch 36 facilitates easy removal of the device. Set into the viewing chamber 31 is a nose notch 33.

Set into the front surface of the hand-held video playback and computing device 38 is a video screen or monitor 39, which may be a touch-screen. The opening at the back of the viewing chamber 31 corresponds to the dimensions of the video screen 39. The focal length of the eyepiece lenses 34 are such that their optimum focus point corresponds to the distance to the video screen 39.

An eye divider 35 ensures that the left eye only sees left image 40 and the right eye only sees right image 41. The bottom of viewing chamber 31 is open to allow finger-tip access to controls such as buttons or a touch screen on the hand-held video playback and computing device 38.

Figure 4D:
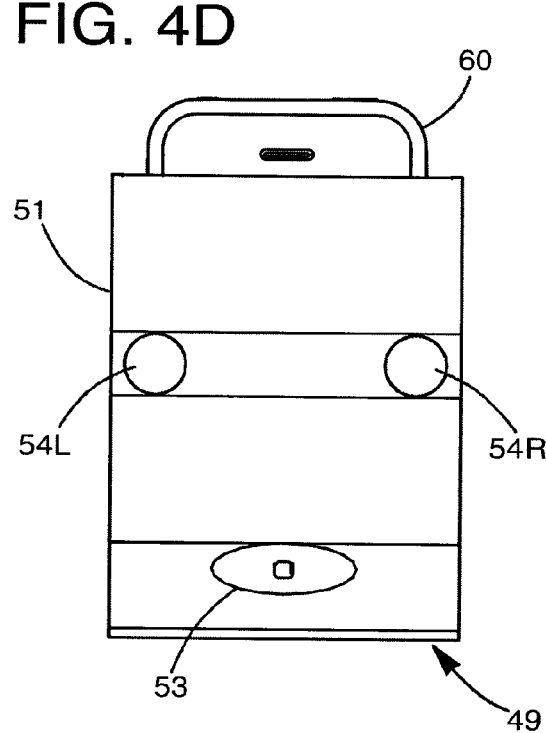
FIG. 4D is a front plan view of an embodiment of a stereoscopic 3D viewer utilizing over/under formatted stereoscopic video.
Figure 4E:
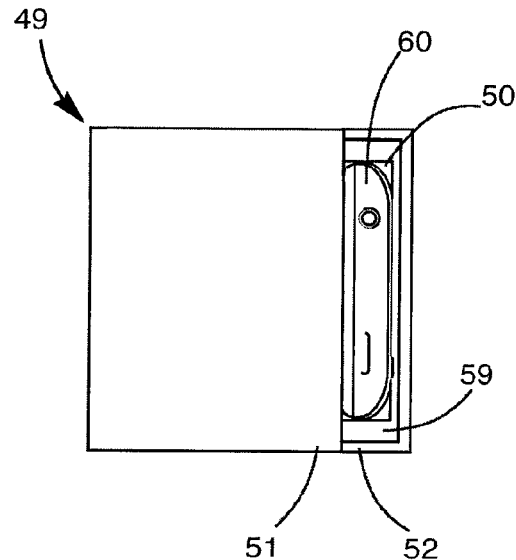
FIG. 4E is a top plan view of an embodiment of a stereoscopic 3D viewer utilizing over/under formatted stereoscopic video.
Figure 4F:
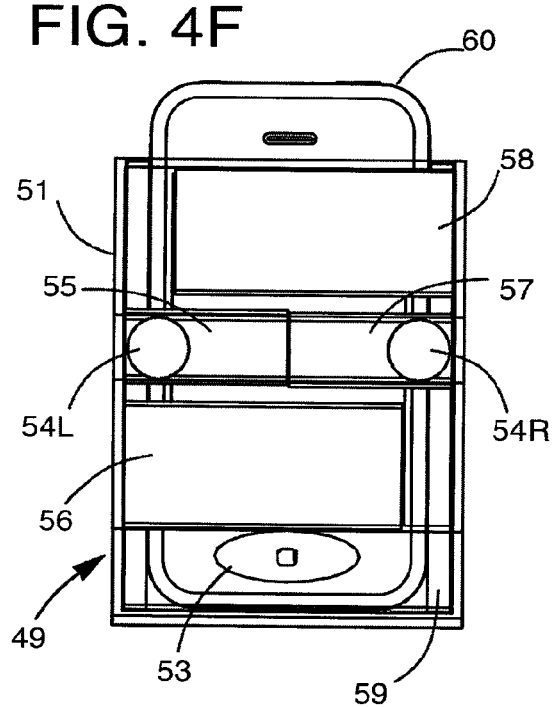
FIG. 4F is a front plan cutaway view of an embodiment of a stereoscopic 3D viewer utilizing over/under formatted stereoscopic video.

Stereoscopic imagery is formatted for the hand-held video playback and computing device 38 in side-by-side, parallel-view fashion. Parallel-view refers to the placement of the left image on the left side of the screen and the right image on the right side of the screen. The two images are of the same scene but are from two slightly different points of view, and are displayed on video screen 39. The first image, indicated by the reference numeral 40 in FIG. 4C, shows a scene from a left point of view. The second image, indicated by the reference numeral 41, shows the same scene from a right point of view. The amount of distance between these two points of view typically corresponds roughly to the average inter-ocular distance, but can be exaggerated for effect.

The material viewed can include a wide variety of pre-existing stereoscopic content, or be generated in real time such as with video games, in which case the viewer could interact with the imagery. In the case of video games, the user could control the game play produced by software in a variety of fashions, including pushing buttons, interacting with a touch screen, making noise, or tilting, rotating, or shaking a device that has an accelerometer and/or a compass. In addition, the user's physical location and orientation could be tracked by accelerometer, compass, and/or GPS in the device and figure into the game play, particularly in online multi-player games.

In addition to the device being hand held, the device could be mounted to a stand so that it might be placed on a table or other surface, or be mounted to straps or a hat to be worn on the viewer's head so as to position it to the viewer's eyes without requiring the use of the viewer's hands. If the viewer wears the device on his or her head, sensors in the hand-held video playback and computing device 38 such as a compass, accelerometer, gyroscope and/or GPS could track position and orientation of the user's head and correspondingly update the point of view of imagery generated in real time. This would effectively turn the device into very inexpensive virtual reality goggles, and provide for a truly immersive interactive experience.

Another embodiment of the 3D hand-held video viewer is illustrated in FIGS. 4A-4H and is intended for over/under formatted stereoscopic imagery. Housing front 51 and housing back 52 are attached and form the main body of the device 49 with an opening at the top 50 into which a hand-held video playback and computing device 60 such as Apple's iPhone® can slide. An opening 53 may be provided for the user to operate the Home button of the iPhone®. Left eyepiece lens 54L and right eyepiece lens 54R are set into corresponding holes in housing front 51. A shell 59, preferably made out of foam rubber, lines the sides and back of the housing back 52 so as to seat the hand-held device 60 snuggly and center its alignment to the eyepiece lenses 54, and also allow for a variety of devices with differing dimensions to be accommodated.

Figure 4G:
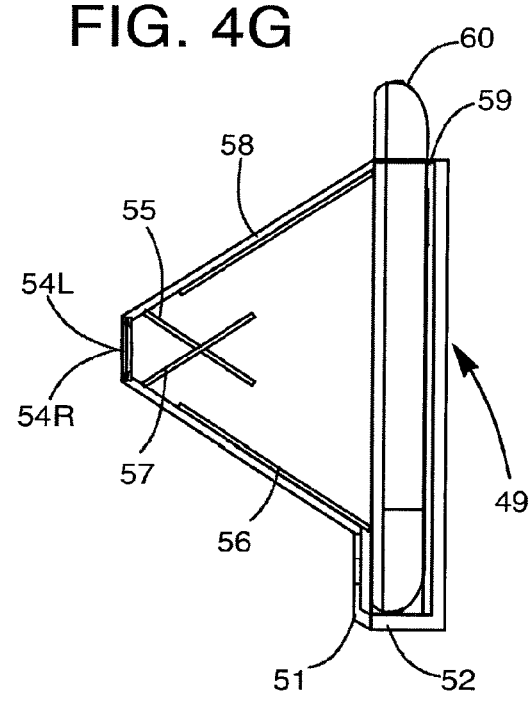
FIG. 4G is a side plan cutaway view of an embodiment of a stereoscopic 3D viewer utilizing over/under formatted stereoscopic video.
Figure 4H:
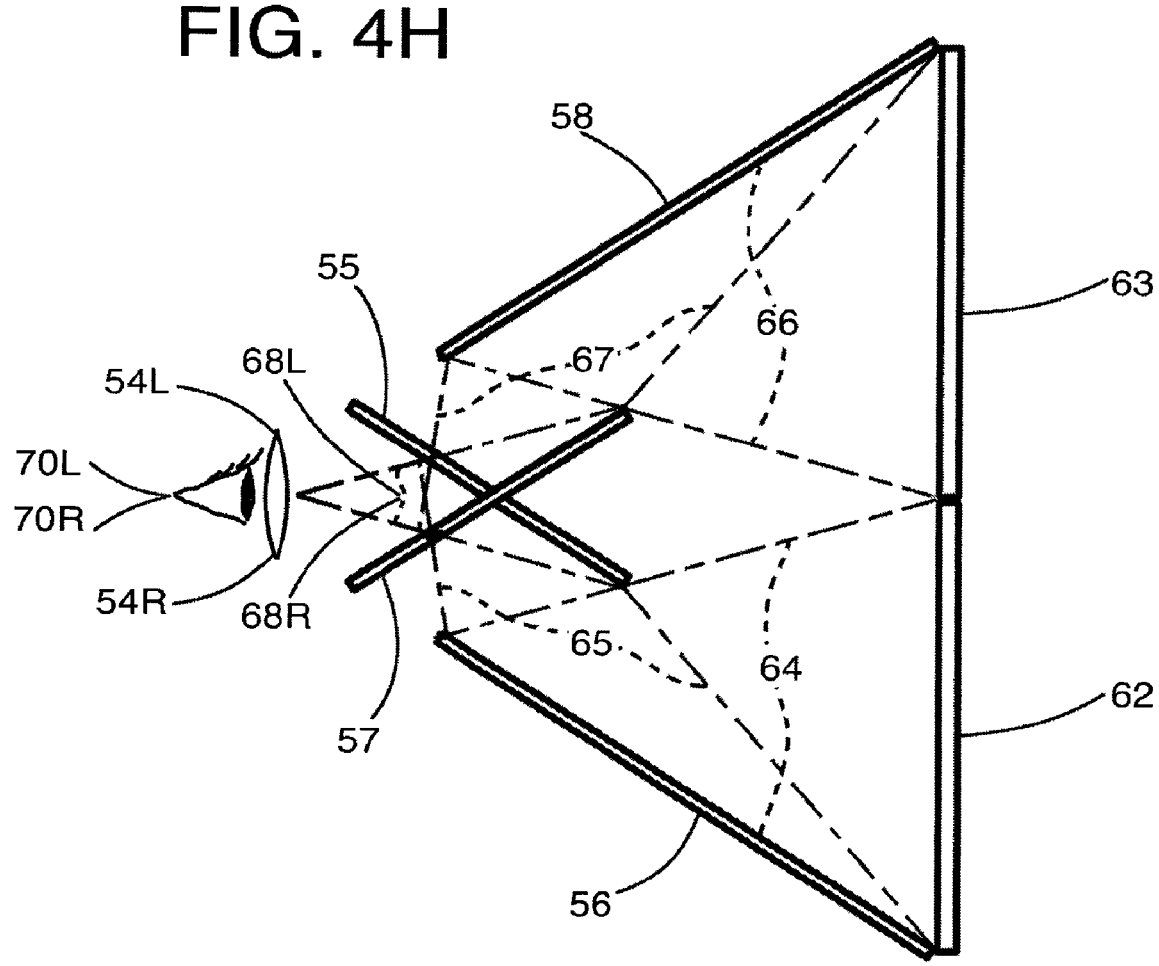
FIG. 4H is a diagrammatic side cutout view of the arrangement of the mirrors which form the optics for the viewer.

A mirror assembly is comprised of four planar reflecting surfaces 55-58, preferably front-surface mirrors. A left front mirror 55 is located on the left side of housing front 51 at an angle to the vertical. The left front mirror 55 is optically aligned with the left eyepiece lens 54L so that it can be viewed through the left eyepiece lens 54L. A left rear mirror 56 is located in the left side of housing front 51 at an angle to the vertical and is optically aligned with the left front mirror 55. The reflecting faces of the mirrors 55 and 56 are facing each other and parallel with each other as shown in FIGS. 4G and 4H. A right front mirror 57 is located on the right side of housing front 51 at an angle to the vertical. The right front mirror 57 is optically aligned with the right eyepiece lens 54R so that it can be viewed through the right eyepiece lens 54R. A right rear mirror 58 is located on the right side of housing front 51 at an angle to the vertical and is optically aligned with the right front mirror 57. The reflecting surfaces of the mirrors 57 and 58 are facing each other and are parallel with each other as shown in FIGS. 4G and 4H.

The optics of this embodiment are diagrammatically illustrated in FIG. 4H and are designed for optically combining two stereoscopically complementary images displayed on the screen 61 of the hand-held video viewer 60. The images 62 and 63 are arranged in the same vertical plane with the image 63 directly above the image 62 as shown in FIGS. 4B, 4C and 4H. The hand-held video monitor 60 is positioned in the main body 49 so that the right rear mirror 58 is in optical alignment with the upper right-eye image 63 and the left rear mirror 56 is in optical alignment with the lower left-eye image 62. The optical path of the first image 63 extends through the area of dot and dashed line 66 to the reflective surface of the right rear mirror 58. The image 63 is reflected from the reflective surface of the mirror 58 to the reflective surface of the mirror 57 extending along a path which is bounded by the dot and dashed lines 67. The image 63 is reflected a second time from the reflective surface of the right front mirror 57 through the right eyepiece lens 54R along the path which is bounded by the dot and dashed lines 68R to a right eye position 70R. The optical path of the second image 62 extends through the area of dot and dashed line 64 to the reflective surface of the left rear mirror 56. The image 62 is reflected from the reflective surface of the mirror 56 to the reflective surface of the mirror 55 extending along a path which is bounded by the dot and dashed lines 65. The image 62 is reflected a second time from the reflective surface of the left front mirror 55 through the left eyepiece lens 54L along the path which is bounded by the dot and dashed lines 68L to a left eye position 70L.

As shown in FIGS. 4G and 4H, front right mirror 57 extends forward, beyond the optical path bounded by the dot and dashed lines 67 that it is reflecting, so that it's front edge resides in the plane formed by left rear mirror 56. This blocks right eye 70R from viewing any portion of the left eye image 62. Similarly, front left mirror 55 extends forward, beyond the optical path bounded by the dot and dashed lines 65 that it is reflecting, so that it's front edge resides in the plane formed by right rear minor 58. This blocks left eye 70L from viewing any portion of the right eye image 63.

For both the stereoscopic kaleidoscope and the stereoscopic 3D viewer embodiments, focus adjustments can be provided to accommodate users with varying visual acuity. In addition, adjustments to inter-ocular spacing can also be made to accommodate a wider range of users.

An improved stereoscopic 3D viewer utilizing over/under formatted stereoscopic images and/or video is described below with respect to FIGS. 5A-11J, and in some instances compared to the stereoscopic 3D viewers illustrated respectively in FIGS. 3A-3F and FIGS. 4A-4H to illustrate certain aspects of the improvements.

The assembly of the improved stereoscopic viewer is illustrated in FIGS. 5A-5F. Frame 80 holds and positions the other components of the viewer relative to each another as described in detail below.

The top of frame 80 is provided with an opening 82 through which a portable computing device 89 (e.g., an Apple iPhone®) can be slotted securely in place within frame 80. Slot 93 at the bottom of frame 80 allows access to a button 92 (e.g., the Apple iPhone's Home button) of the portable computing device 89. Slot 93 also allows a user to push the portable computing device 89 upwards to remove it from frame 80. The portable computing device 89 is provided with a screen or touch screen 83 on which over/under formatted stereoscopic images or video can be displayed, such that stereoscopically complementary left-eye image 90 and right-eye image 91 are respectively displayed in the top and bottom portions of the touch screen 83 in the illustrated embodiment of the improved stereoscopic viewer. (In another embodiment the improved stereoscopic viewer can be implemented such that the left-eye and right-eye images are respectively displayed on the bottom and top portions of touch screen 83).

Frame 80 is provided with left eye hole 81L and right eye hole 81R into which left lens 84L and right lens 84R may be respectively inserted. The left lens 84L and the right lens 84R may be shielded respectively with left eyecup 95L and right eyecup 95R to prevent extraneous light from enter from entering the user's eye. The left eyecup 95L and the right eyecup 95R are preferably made of rubber, silicone or another flexible material for comfort and to allow the left eyecup 95L and the right eyecup 95R to be folded back to accommodate a user wearing glasses. The left eyecup 95L and right eyecup 95R may also be removable.

Left front mirror 85, left rear mirror 86, right front minor 87 and right rear mirror 88 are mounted within frame 80. A minor includes any reflective surface. Preferably, mirrors 85-88 are front-surface minors. The user views the left-eye image 90 by using left lens 84L, left front mirror 85 and left rear mirror 86, and the right-eye image 91 by using right lens 84R, right front minor 87 and right rear minor 88. The aforementioned components define optical paths (discussed in further detail below) which are shrouded by top housing 96 and bottom housing 97 to prevent extraneous light from entering into the improved stereoscopic viewer. The top and bottom housings may individually be removable, hinged or slidable to allow access to the touch screen 83.

With reference to FIGS. 5A, 5B, 5E, and 5F, a window 98 (defined by frame 80 and bottom housing 97 in the illustrated embodiment) may be provided to allow the user access to a portion of the touch screen 83 that may be programmed as a control strip 99. Control strip 99 may be used to control the playback of the stereoscopic images and/or video, and to play a video game having stereoscopic imagery. Various other cutouts and openings may be provided in frame 80 to accommodate other ports, sockets, buttons, switches, speakers, microphones and/or cameras of the portable computing device 89.

Figure 5C:
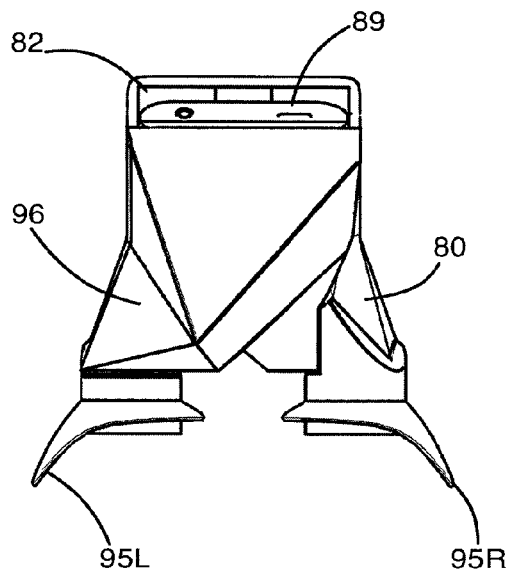
FIG. 5C is a top plan view of the improved stereoscopic 3D viewer illustrated in FIG. 5A.
Figure 5D:
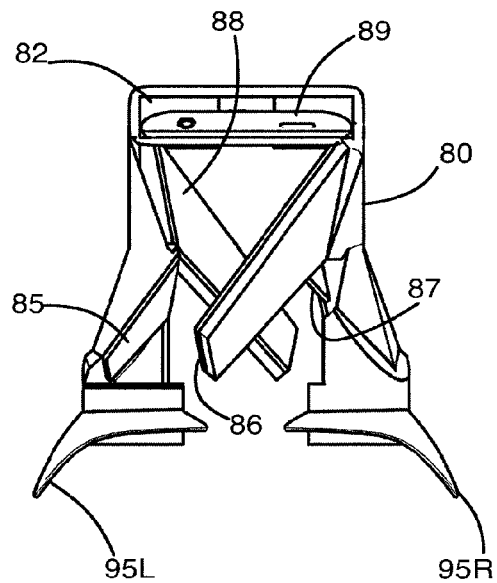
FIG. 5D is a top plan view of the improved stereoscopic 3D viewer illustrated in FIG. 5A with its top and bottom housings removed, to show the arrangement of the mirrors within the improved stereoscopic 3D viewer.
Figure 5E:
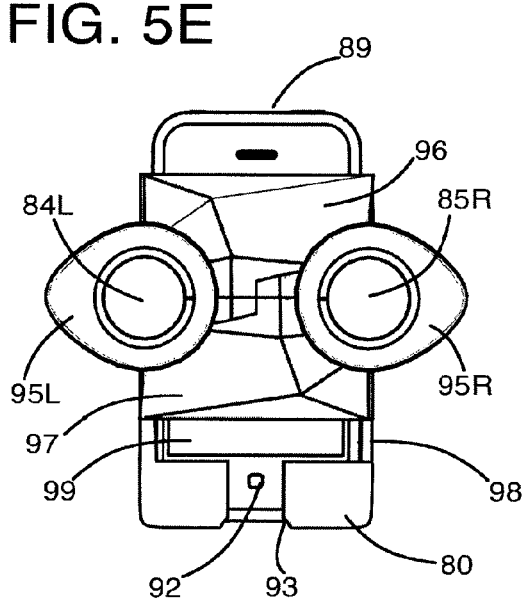
FIG. 5E is a front plan view of the improved stereoscopic 3D viewer illustrated in FIG. 5A.
Figure 5F:
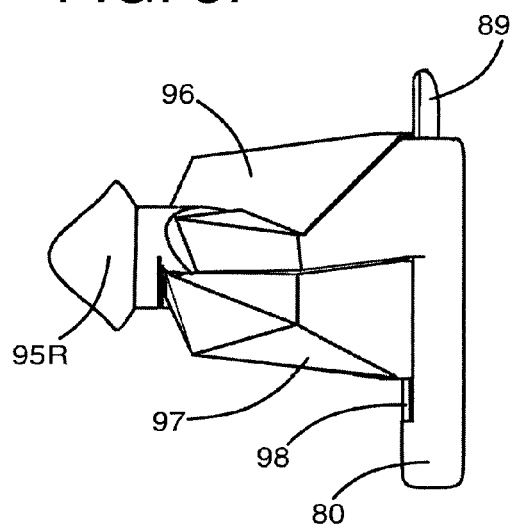
FIG. 5F is a side plan view of the improved stereoscopic 3D viewer illustrated in FIG. 5A.

The arrangement of left front mirror 85, left rear mirror 86, right front mirror 87 and right rear mirror 88 within frame 80 is shown in FIGS. 5A and 5D. The reflective surfaces of the left front mirror 85 and the left rear mirror 86 face each other, while the reflective surfaces of the right front mirror 87 and the right rear mirror 88 face each other. Unlike the stereoscopic 3D viewer illustrated in FIGS. 4A-4H, (in which the four mirrors 55-58 are tilted only with respect to a horizontal plane bisecting screen 61,) the mirrors 85-88 are arranged at compound angles, such that each mirror is tilted with respect to both a horizontal plane dividing the left eye image 90 and the right eye image 91 on the touch screen 83 as well as a vertical plane bisecting the left and right halves of the improved stereoscopic viewer. From the perspective of the user's eyes, the tilting of mirrors 85-88 with respect to the horizontal plane affects the vertical positions of left-eye image 90 and right-eye image 91, while the tilting of mirrors 85-88 with respect to the vertical plane affects the horizontal positions of left-eye image 90 and right-eye image 91.

The left front mirror 85, left rear mirror 86, right front mirror 87 and right rear mirror 88 are arranged such that they combine stereoscopically complementary left-eye image 90 and right-eye image 91 (which may be part of a stereoscopic video) displayed respectively on the top and bottom portions of the touch screen 83 by reflecting the left-eye image 90 and the right-eye image 91 respectively through the left lens 84L and the right lens 84R, such that the left-eye image 90 and the right-eye image 91 respectively enter the left and right eyes of the user along substantially parallel optical paths, as discussed below with respect to FIGS. 6A-7D.

FIGS. 6A-6D show the optical path from the left-eye image 90 to the left eye. It can be divided in three thirds. The rear third refers to the section of the optical path between the left-eye image 90 and the left rear mirror 86, the middle third refers to the section between the left rear minor 86 and the left front mirror 85, and the front third refers to the section between the left front mirror 85 and the left eye. The left-eye image 90 is reflected by left rear mirror 86 onto the left front minor 85, which in turn reflects the left-eye image 90 through the left lens 84L into the left eye. From the left eye's perspective, the optical path for the left eye shifts the left-eye image 90 to the left and downwards such that the intended view of the left-eye image 90 by the left eye is centered to the left lens 84L.

FIGS. 7A-7D show the optical path from the right-eye image 91 to the right eye. It can also be divided in three thirds. The rear third refers to the section of the optical path between the right-eye image 91 and the right rear minor 88, the middle third refers to the section between the right rear minor 88 and the right front minor 87, and the front third refers to the section between the right front minor 87 and the right eye. The right-eye image 91 is reflected by right rear mirror 88 onto the right front minor 87, which in turn reflects the right-eye image 91 through the right lens 84R into the right eye. From the right eye's perspective, the optical path for the right eye shifts the right-eye image 91 to the right and upwards such that the intended view of the right-eye image 91 by the right eye is centered to the right lens 84R.

Preferably the left lens 84L and the right lens 85R are aligned with the border between the left eye image 90 and the right eye image 91 on the touch screen 83. Preferably, the distance between the left lens 84L and the right lens 85R is set to accommodate a wide range of interocular distance. The improved stereoscopic 3D viewer may in certain embodiments further provide for adjustment of the interocular distance.

Figure 6A:
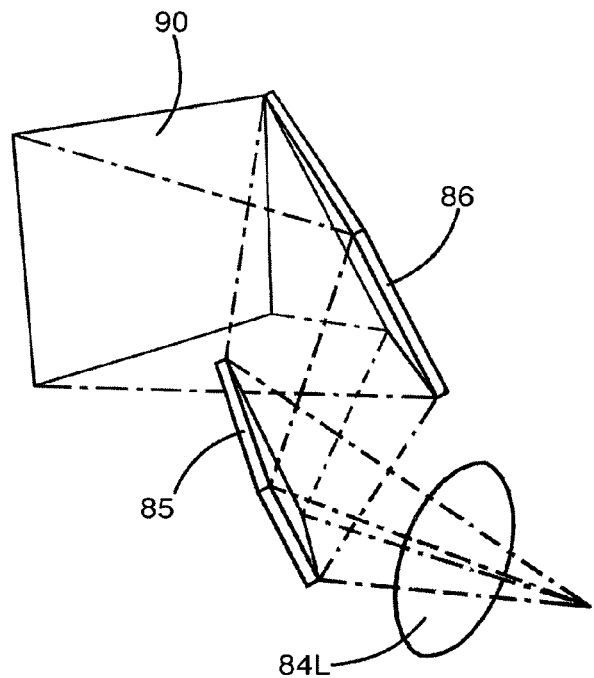
FIG. 6A is a perspective view of the optical path for the left eye showing the components of the optical path in an improved stereoscopic 3D viewer utilizing over/under formatted stereoscopic imagery according to one embodiment of the present invention.
Figure 6B:
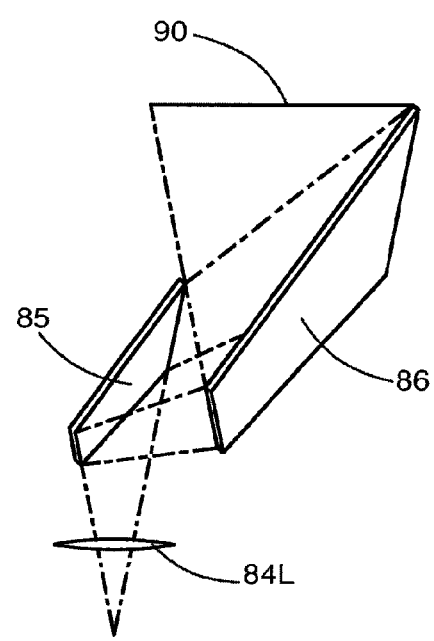
FIG. 6B is a top plan view of the optical path for the left eye showing the components of the optical path for the left eye illustrated in FIG. 6A.
Figure 6C:
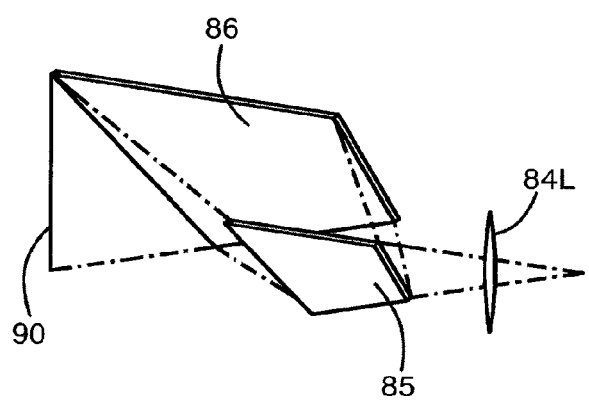
FIG. 6C is a left side plan view of the optical path for the left eye showing the components of the optical path for the left eye illustrated in FIG. 6A.
Figure 6D:
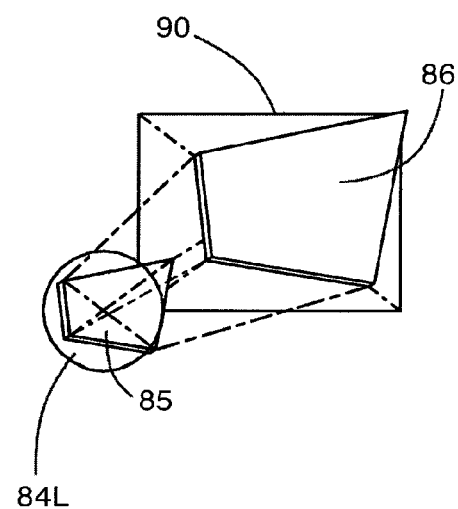
FIG. 6D is a front plan view of the optical path for the left eye showing the components of the optical path for the left eye illustrated in FIG. 6A.
Figure 7A:
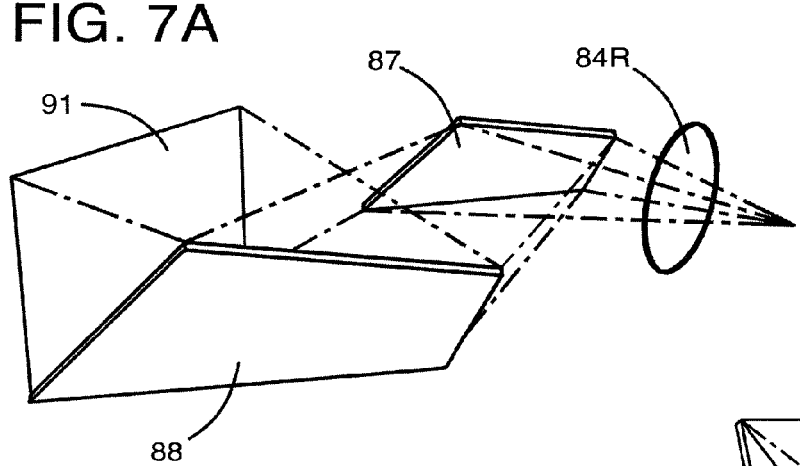
FIG. 7A is a perspective view of the optical path for the right eye showing the components of the optical path in an improved stereoscopic 3D viewer utilizing over/under formatted stereoscopic imagery according to one embodiment of the present invention.
Figure 7B:
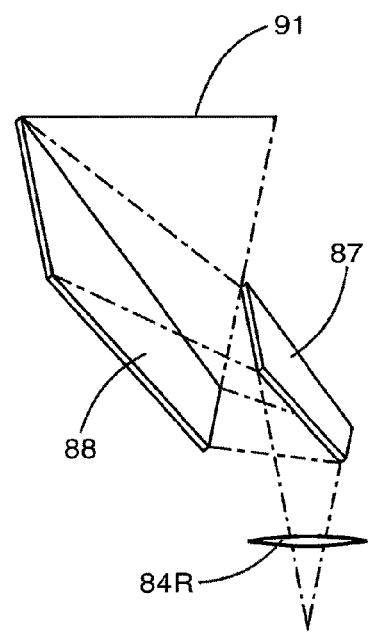
FIG. 7B is a top plan view of the optical path for the right eye showing the components of the optical path for the right eye illustrated in FIG. 7A.
Figure 7C:
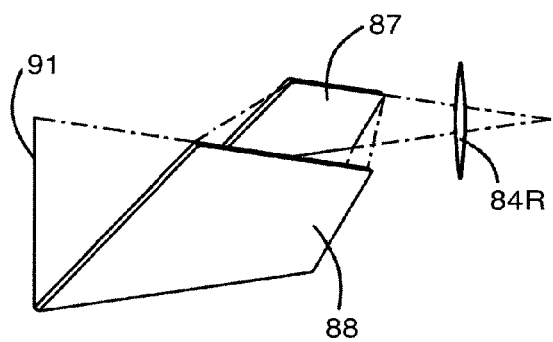
FIG. 7C is a left side plan view of the optical path for the right eye showing the components of the optical path for the right eye illustrated in FIG. 7A.
Figure 7D:
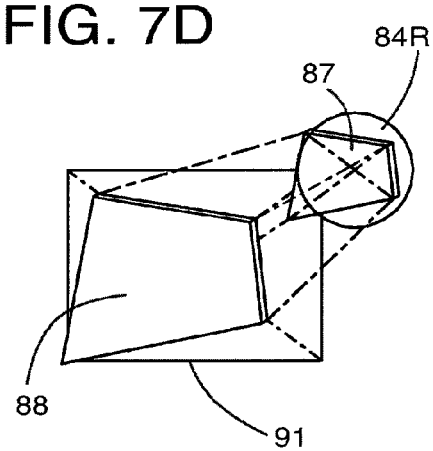
FIG. 7D is a front plan view of the optical path for the right eye showing the components of the optical path for the right eye illustrated in FIG. 7A.

As shown in FIGS. 6B and 7B (the respective top plan views of the left and right optical paths), the left-eye image 90 and the right-eye image 91 respectively pass through the left lens 84L and the right lens 84R and then enter the left and right eyes along substantially parallel optical paths. In other words, the front third of the left optical path (i.e., the section of the optical path between the left front mirror 85 and the left eye) is substantially parallel to the front third of the right optical path (i.e., the section between the right front mirror 87 and the right eye).

In the stereoscopic 3D viewer shown in FIGS. 4A-4H, the lower left-eye image 62 and the upper right-eye image 63 respectively enter the left and right eyes of the user along divergent optical paths. This also occurs in the stereoscopic 3D viewer shown in FIGS. 3A-3F, where the left eye image 40 and the right eye image 41 respectively enter the left and right eyes of the user along divergent optical paths, albeit diverging to a lesser degree or at a smaller angle compared to that for the stereoscopic 3D viewer shown in FIGS. 4A-4H. The divergence of the optical paths requires the user to cross eyes to stereoscopically combine the left-eye image (40 or 62) and the right-eye image (41 or 63). This is uncomfortable for some, especially when viewing for extended periods. Moreover, certain users who suffer from a condition known as convergence insufficiency are unable to hold their eyes in a cross-eyed fashion to converge the image perceived by the left eye with the image perceived by the right eye. This uncomfortable requirement is eliminated or at least significantly reduced in the improved stereoscopic 3D viewer because the left-eye image 90 and the right-eye image 91 respectively enter the left and right eye of the user along substantially parallel optical paths.

The parallel optical paths taken by the left-eye image 90 and the right-eye image 91 as they respectively enter into the left and right eyes also confer the additional advantage of better focus and therefore a sharper image across the entire field of view, in comparison to the stereoscopic 3D viewers shown in FIGS. 3A-3F and FIGS. 4A-4H, respectively.

Another aspect of the improved stereoscopic 3D viewer is described below with reference to FIGS. 8A-10H.

Referring again to FIGS. 6A-6D, in addition to the optical path from the left-eye image 90 to the left eye as described with respect thereto, the left eye of the user can also see a portion of the left-eye image 90 directly, by looking through the left lens 84L directly at the portion of the left-eye image 90 visible above and to the right of the left front mirror 85 and through the gap between the left front minor 85 and the left rear mirror 86, without using either mirror. And, because the left-eye image 90 is displayed above the right-eye image 91 on the touch screen 83, the left eye can also directly see a portion of the right-eye eye image 91 through the same gap, especially if both the left-eye image 90 and the right-eye image 91 are full frame images.

Figure 10A:
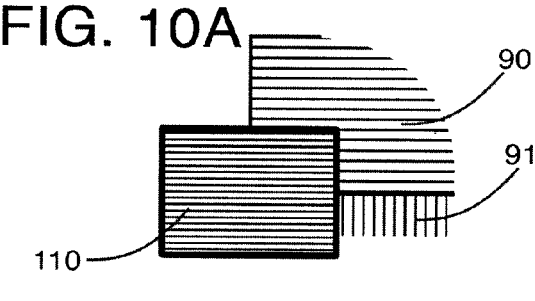
FIG. 10A is diagram illustrating the intended view and the extraneous direct view of the screen by the left eye corresponding to the optical path illustrated in FIGS. 6A-6D.

The extraneous direct view of the left-eye image 90 and the right-eye eye image 91 by the left eye is shown in FIG. 10A. In addition to the intended left-eye image 110 (i.e., the reflection of the left-eye image 90 by left rear mirror 86 onto the left front mirror 85 and through the left lens 84L), the left eye can also directly see portions of the left-eye image 90 and the right-eye eye image 91 as described above. The curve in the extraneous view results from the circular shape of the left eye hole 81L.

The same issue arises with respect to the right eye. Referring again to FIGS. 7A-7D, in addition to the optical path from the right-eye image 91 to the right eye as described with respect thereto, the right eye of the user can also see a portion of the right-eye image 91 directly, by looking through the right lens 84R directly at the portion of the right-eye image 91 visible below and to the left of the right front mirror 87 and through the gap between the right front mirror 87 and the right rear mirror 88, without using either mirror. And, because the left-eye image 90 is displayed above the right-eye image 91 on the touch screen 83, the right eye can also directly see a portion of the left-eye eye image 90 through the same gap, especially if both the left-eye image 90 and the right-eye image 91 are full frame images.

Figure 10B:
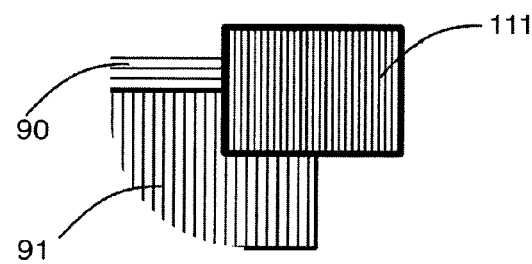
FIG. 10B is diagram illustrating the intended view and the extraneous direct view of the screen by the right eye corresponding to the optical path illustrated in FIGS. 7A-7D.

The extraneous direct view of the left-eye image 90 and the right-eye eye image 91 by the right eye is shown in FIG. 10B. In addition to the intended right-eye image 111 (i.e., the reflection of the right-eye image 91 by right rear mirror 88 onto the right front mirror 87 and through the right lens 84R), the right eye can also directly see portions of the left-eye image 90 and the right-eye eye image 91 as described above.

The curve in the extraneous view results from the circular shape of the right eye hole 81R.

To approximate the stereoscopic image seen by the user, FIGS. 10A and 10B may be superimposed such that the intended left-eye image 110 and the intended right-eye image 111 completely overlap each other. So, in addition to the intended stereoscopic image (formed by the stereoscopic combination of the intended left-eye image 110 and the intended right-eye image 111), the user also sees four other extraneous, incomplete images that do not have a stereoscopic effect by directly looking at the touch screen 83 through the lenses. Under most circumstances, this effect is distracting and undesirable. So, according to another aspect of the invention, the improved stereoscopic 3D viewer is provided with one or more baffles to block the extraneous direct viewing of the touch screen 83.

As discussed above, each intended optical path can be divided into three thirds. With respect to the left optical path, the rear third refers to the section of the intended optical path between the left-eye image 90 and the left rear mirror 86, the middle third refers to the section between the left rear mirror 86 and the left front mirror 85, and the front third refers to the section between the left front mirror 85 and the left eye. Likewise, with respect to the right optical path, the rear third refers to the section of the intended optical path between the right-eye image 91 and the right rear mirror 88, the middle third refers to the section between the right rear mirror 88 and the right front mirror 87, and the front third refers to the section between the right front mirror 87 and the right eye.

FIGS. 8A-8D show the optical path from the left-eye image 90 to the left eye from the same four perspectives in FIGS. 6A-6D, except that the left lens 84L is not shown in FIGS. 8A-8D. As shown in FIGS. 8A-8D, a left front baffle 102 is inserted between the left front mirror 85 and the left lens 84L (not shown) in the front third of the left optical path. The left front baffle 102 is provided with a rectangular aperture of approximately the same size as the cross-section of the optical path at the point where the left front baffle 102 intersects the front third of the left optical path.

FIGS. 9A-9D show the optical path from the right-eye image 91 to the right eye from the same four perspectives in FIGS. 7A-7D, except that the right lens 84R is not shown in FIGS. 9A-9D. As shown in FIGS. 9A-9D, a right front baffle 106 is inserted between the right front mirror 87 and the right lens 84R (not shown) in the front third of the right optical path. The right front baffle 106 is provided with a rectangular aperture of approximately the same size as the cross-section of the optical path at the point where the right front baffle 106 intersects the front third of the right optical path.

Although the front baffles 102 and 106 in the illustrated embodiment are shown as circular baffles with rectangular apertures, they can be implemented using different shapes to accomplish the same functions described above.

As discussed above, the left eye sees an the extraneous view of the touch screen 83 above and to the right of the left front mirror 85 and through the gap between the left front mirror 85 and the left rear mirror 86. So the left front baffle 102 may be implemented as an inverted "L" shape blocking the extraneous view by the left eye of the touch screen 83 above and to the right of the left front mirror 85 and through the gap between the left front mirror 85 and the left rear mirror 86.

As discussed above, the right eye sees an the extraneous view of the touch screen 83 below and to the left of the right front mirror 87 and through the gap between the right front mirror 87 and the right rear mirror 88. So the right front baffle 106 may be implemented as an "L" shape blocking the extraneous view by the right eye of the touch screen 83 below and to the left of the right front mirror 87 and through the gap between the right front mirror 87 and the right rear mirror 88.

The extraneous direct view of the touch screen 83 by the left eye is completely blocked if the rectangular aperture of the left front baffle 102 perfectly matches the cross-section of the left optical path at the intersection of the left front baffle 102 and the front third of the left optical path. Likewise, the extraneous direct view of the touch screen 83 by the right eye is also completely blocked if the rectangular aperture of the right front baffle 106 perfectly matches the cross-section of the right optical path at the intersection of the right front baffle 102 and the front third of the right optical path.

However, a perfect match in size between the cross-section of optical path and the rectangular aperture of the front baffle (102 or 106) is somewhat difficult, because the optical path is not precisely fixed, but varies from user to user depending on factors such as the distance between an eye and the corresponding lens (84L or 84R), whether the eye is perfectly centered with respect to the lens (which in turn depends on the interocular distance of the user), whether the user wears glasses, etc.

If the rectangular aperture of the left front baffle 102 is made smaller than the cross-section of the left optical path at the intersection of the left front baffle 102 and the left optical path, then the intended left-eye image 110 is cropped with respect to the left-eye image 90 shown on the top portion of touch screen 83. Similarly, if the rectangular aperture of the right front baffle 106 is made smaller than the cross-section of the right optical path at the intersection of the right front baffle 106 and the right optical path, then the intended right-eye image 111 is cropped with respect to the right-eye image 91 shown on the bottom portion of touch screen 83.

To achieve a perfect match between the intended optical path and the rectangular aperture of the front baffle (102 or 106), various adjustments may be provided on the improved stereoscopic 3D viewer. For example, the size of the rectangular aperture may be adjusted with movable slats at the perimeter of the aperture. Or, the size of the rectangular aperture is fixed while allowing the distance between the front baffle (102 or 106) and the lens (84L or 84R) to be adjusted. The improved stereoscopic 3D viewer may further provide for adjustment of the interocular distance so that each eye can be perfectly centered with the corresponding lens. Additionally, a resize feature may be implemented in the portable computing device 89 (e.g., via software) so that the left-eye image 90 and the right-eye image 91 can be adjustably resized to respectively fit the rectangular apertures of the left front baffle 102 and the right front baffle 106.

However, providing such adjustments on a stereoscopic 3D viewer increases its complexity and its manufacturing cost, while allowing the left-eye image 90 and the right-eye image 91 to be resized leads to a loss of resolution if either image is displayed using a smaller screen area than the corresponding allotted portion of the touch screen 83.

Figure 10C:
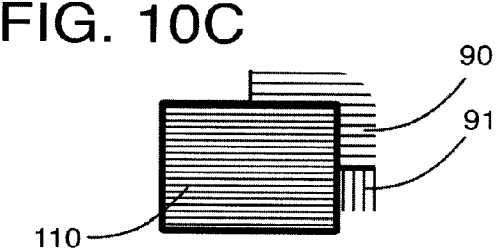
FIG. 10C is diagram illustrating the intended view and the reduction of the extraneous direct view of the screen by the left eye associated with the use of only the front baffle illustrated in FIGS. 8A-8D.
Figure 10D:
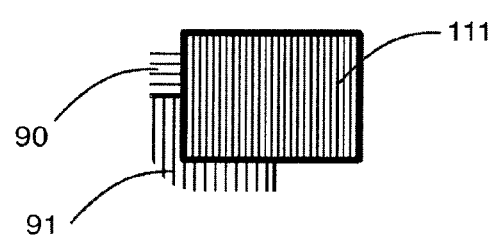
FIG. 10D is diagram illustrating the intended view and the reduction of the extraneous direct view of the screen by the right eye associated with the use of only the front baffle illustrated in FIGS. 9A-9D.

Conversely, the rectangular aperture in left front baffle 102 can be made slightly larger than the cross-section of the left optical path at the intersection of the left front baffle 102 and the left optical path, and the rectangular aperture of the right front baffle 106 can likewise be made slightly larger than the cross-section of the right optical path at the intersection of the right front baffle 106 and the right optical path, to accommodate a variety of users without providing the aforementioned adjustments. By doing so, a small portion of the extraneous direct view of the touch screen 83 by each eye remains, as illustrated in FIGS. 10C (for the left eye) and 10D (for the right eye). This represents an improvement over the extent of the extraneous direct view of the touch screen 83 by the left and right eyes respectively shown in FIGS. 10A and 10B.

To further reduce the extraneous direct view of the touch screen 83 by each eye, an additional baffle may be inserted into the rear third of each intended optical path as discussed in detail below.

Referring again to FIGS. 8A-8D, a left rear baffle 100 is inserted in the rear third of the left optical path (between the left-eye image 90 and the left rear mirror 86), preferably as close to the left front mirror 85 as possible without obstructing the middle third of the left optical path (between the left rear mirror 86 and the left front mirror 85). In the illustrated embodiment, the left rear baffle 100 has an "L" shape and abuts the left and bottom edges of the cross-section of the left optical path at the intersection between left rear baffle 100 and the rear third of the left optical path.

Figure 8A:
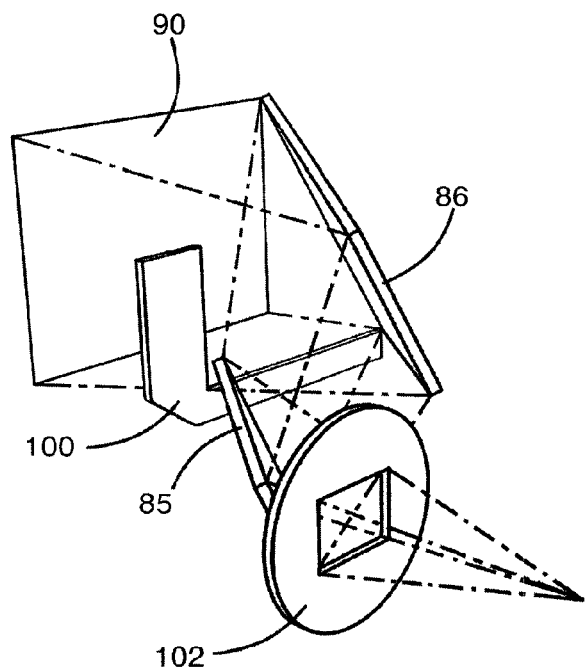
FIG. 8A a perspective view of the optical path for the left eye showing the components of the optical path in an improved stereoscopic 3D viewer utilizing over/under formatted stereoscopic imagery according to another embodiment of the present invention with a front baffle and a rear baffle for the optical path.
Figure 8B:
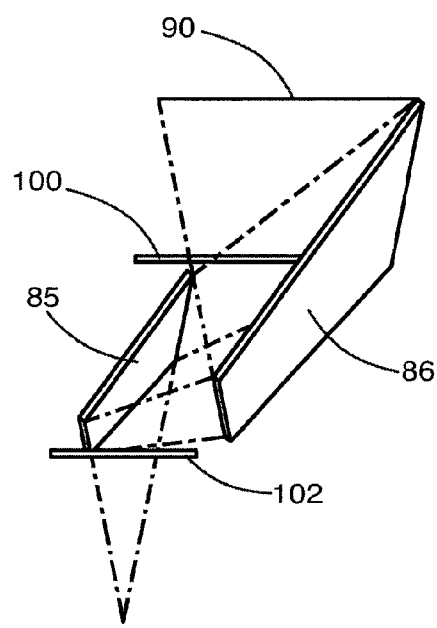
FIG. 8B is a top plan view of the optical path for the left eye showing the components of the optical path for the left eye illustrated in FIG. 8A.
Figure 8C:
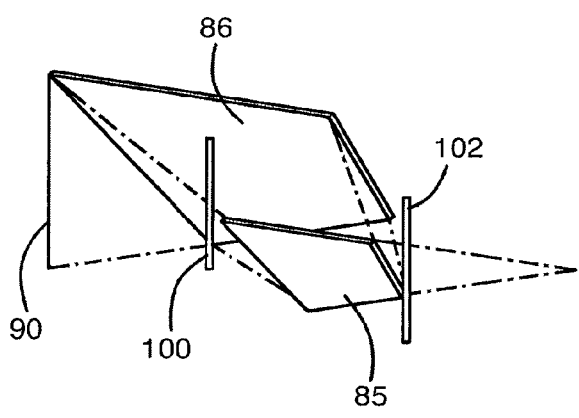
FIG. 8C is a left side plan view of the optical path for the left eye showing the components of the optical path for the left eye illustrated in FIG. 8A.
Figure 8D:
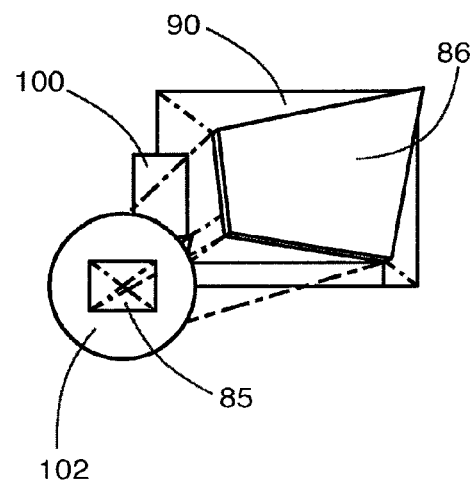
FIG. 8D is a front plan view of the optical path for the left eye showing the components of the optical path for the left eye illustrated in FIG. 8A.

As shown in FIGS. 8A and 8C, the vertical arm of the left rear baffle 100 does not need to fully extend all the way up the left edge of the cross-section of the left optical path at the intersection between left rear baffle 100 and the rear third of the left optical path. Instead, that arm needs only extend as high as a straight line (not shown) drawn between the left eye and the top of left eye image 90.

Referring again to FIGS. 9A-9D, a right rear baffle 104 is inserted in the rear third of the right optical path (between the right-eye image 91 and the right rear mirror 88), preferably as close to the right front mirror 87 as possible without obstructing the middle third of the right optical path (between the right rear minor 88 and the right front mirror 87). In the illustrated embodiment, the right rear baffle 104 has an inverse "L" shape and abuts the top and right edges of the cross-section of the right optical path at the intersection between the right rear baffle 104 and the rear third of the right optical path.

Figure 9A:
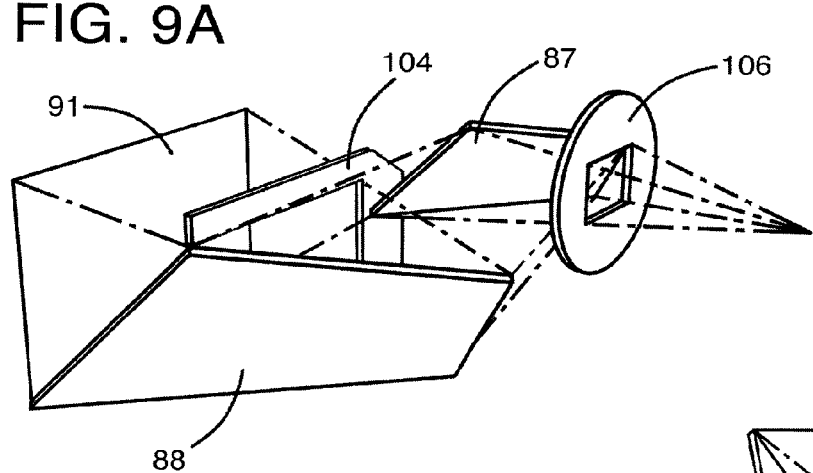
FIG. 9A is a perspective view of the optical path for the right eye showing the components of the optical path in an improved stereoscopic 3D viewer utilizing over/under formatted stereoscopic imagery according to another embodiment of the present invention with a front baffle and a rear baffle for the optical path.
Figure 9B:
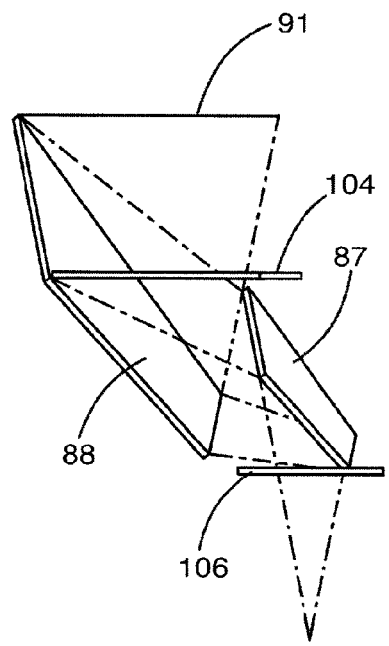
FIG. 9B is a top plan view of the optical path for the right eye showing the components of the optical path for the right eye illustrated in FIG. 9A.
Figure 9C:
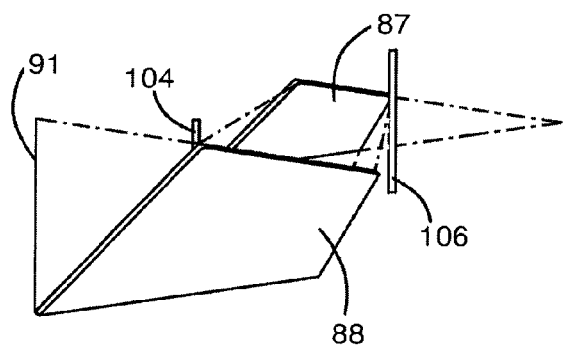
FIG. 9C is a left side plan view of the optical path for the right eye showing the components of the optical path for the right eye illustrated in FIG. 9A.
Figure 9D:
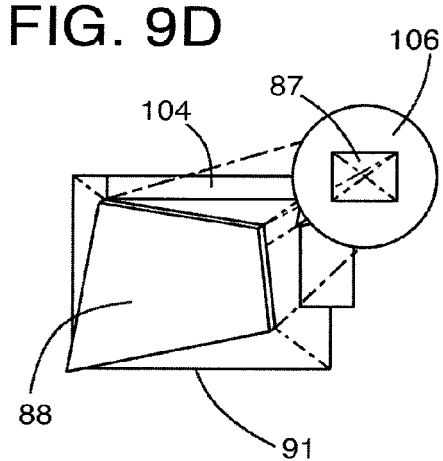
FIG. 9D is a front plan view of the optical path for the right eye showing the components of the optical path for the right eye illustrated in FIG. 9A.

As shown in FIG. 9D, the vertical arm of the right rear baffle 104 does not need to fully extend all the way down the right edge of the cross-section of the right optical path at the intersection between right rear baffle 104 and the rear third of the right optical path. Instead, that arm needs only extend as far down as a straight line (not shown) drawn between the right eye and the bottom of right eye image 91.

Figure 10E:
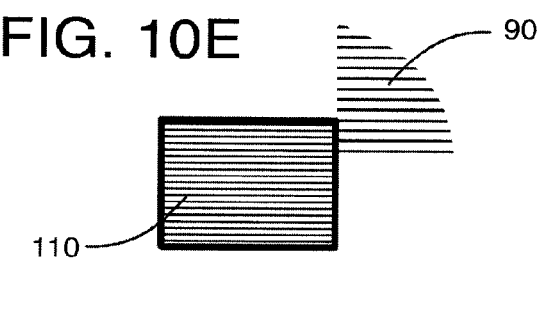
FIG. 10E is diagram illustrating the intended view and the reduction of the extraneous direct view of the screen by the left eye associated with the use of only the rear baffle illustrated in FIGS. 8A-8D.
Figure 10F:
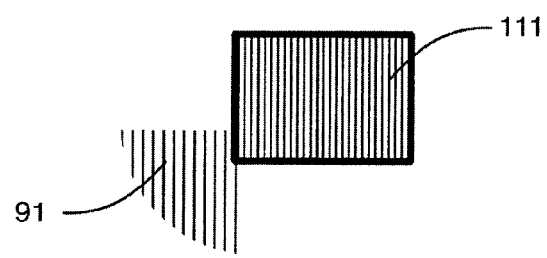
FIG. 10F is diagram illustrating the intended view and the reduction of the extraneous direct view of the screen by the right eye associated with the use of only the rear baffle illustrated in FIGS. 9A-9D.

The effect of the left rear baffle 100 alone on the extraneous direct view of the touch screen 83 by left eye is shown in FIG. 10E, while the effect of the right rear baffle 104 alone on the extraneous direct view of the touch screen 83 by right eye is shown in FIG. 10F. FIG. 10E represents an improvement over the extent of the extraneous direct view of the touch screen 83 by the left eye shown in FIG. 10A, while FIG. 10F represents an improvement over the extent of the extraneous direct view of the touch screen 83 by the right eye shown in FIG. 10B.

Figure 10G:
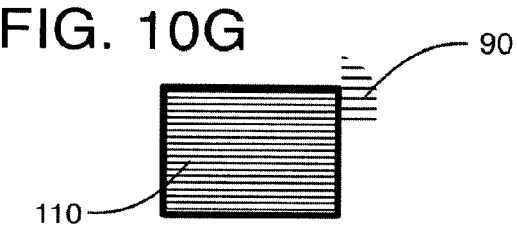
FIG. 10G is diagram illustrating the intended view and the reduction of the extraneous direct view of the screen by the left eye associated with the use of both the front and rear baffles illustrated in FIGS. 8A-8D.
Figure 10H:
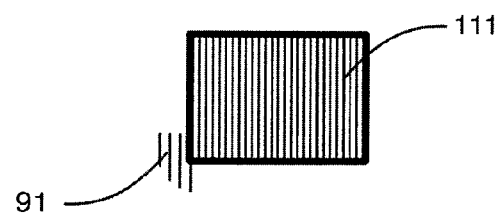
FIG. 10H is diagram illustrating the intended view and the reduction of the extraneous direct view of the screen by the right eye associated with the use of both the front and rear baffles illustrated in FIGS. 9A-9D.

FIG. 10G is a combination of FIGS. 10C and 10E, and illustrates the combined effect on the extraneous direct view of the touch screen 83 by the left eye when both the left front baffle 102 and the left rear baffle 100 are incorporated as part of the optical path for the left eye. FIG. 10H is a combination of FIGS. 10E and 10F, and illustrates the combined effect on the extraneous direct view of the touch screen 83 by the right eye when both the right front baffle 106 and the right rear baffle 104 are incorporated as part of the optical path for the right eye.

Superimposing FIGS. 10G and 10H such that the intended left-eye image 110 and the intended right-eye image 111 completely overlap each other to approximate the stereoscopic image seen by the user, the extraneous direct view of the touch screen 83 by either eye is nearly eliminated by using a front baffle in the front third of each optical path and a rear baffle in the rear third of each optical path. The use of two baffles per optical path reduces complexity and manufacturing cost compared to the use of a single adjustable front baffle per optical path.

Although the left rear baffle 100 and the right rear baffle 104 are individually and separately illustrated with respect to the left and right optical paths (respectively), in practice the respective horizontal arm of each rear baffle may abut one another, and thus the left rear baffle 100 and the right rear baffle 104 may be combined into a single rear baffle having a horizontal arm, an upward-extending vertical arm at the left end of the horizontal arm, and a downward-extending vertical arm at the right end of the horizontal arm, where the touch screen 83 of the improved stereoscopic 3D viewer is set up to show the left-eye image 90 on its top portion and the right-eye image 91 on its bottom portion.

Generally, for a given screen size, a stereoscopic 3D viewer utilizing over/under formatted stereoscopic images on a vertically-oriented screen is advantageous compared to a stereoscopic 3D viewer utilizing side-by-side formatted stereoscopic images on horizontally-oriented screen, because the former allows more of the screen to be used to display the stereoscopic images, thus improving the resolution of the displayed images.

Figure 11A:
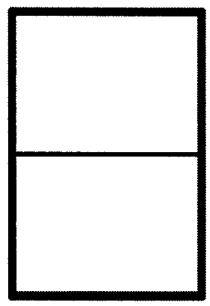
FIG. 11A is a diagram of a vertical screen divided into two landscape windows.

Dividing the screen or touch screen 83 of most currently available portable computing devices 89 (e.g., an Apple iPhone®) into two equally-sized windows, each displaying one of a stereoscopically complementary image pair, generally each window has a landscape orientation if the device 89 is held vertically, resulting in the over/under format illustrated in FIG. 11A. Conversely, each window has a portrait orientation if the device 89 is held horizontally, resulting in the side-by-side format illustrated in FIG. 11B.

Nearly all currently existing video content—e.g., television programs, movies, most video games, etc.—is in landscape format, because human visual perception through the left and right eyes naturally result in a landscape field of view. Landscape-formatted video content is preferably displayed in landscape-oriented windows, to make use of as much of each window as possible and thus maximize the resolution of the displayed images.

Figure 11B:
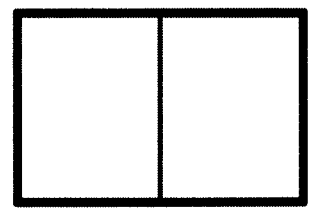
FIG. 11B is a diagram of a horizontal screen divided into two portrait windows.

Using the iPhone® 4 as a specific example, this portable computing device 89 is provided with a touch screen 83 that is 640 pixels wide and 960 pixels high, or a 640×960 screen. The touch screen 83 is divided into two over/under 640×480 landscape windows (as shown in FIG. 11A) if the device 89 is held vertically, or two 480×640 side-by-side portrait windows (as shown in FIG. 11B) if the device 89 is held horizontally.

Figure 11C:
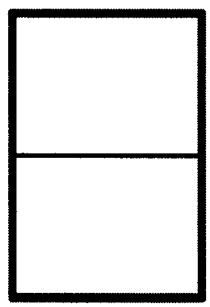
FIG. 11C is a diagram of a vertical screen divided into two landscape windows each displaying an image with a 4:3 aspect ratio.
Figure 11D:
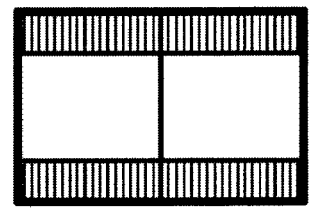
FIG. 11D is a diagram of a horizontal screen divided into two portrait windows each displaying an image with a 4:3 aspect ratio.

Older television programs and games often have a 4:3 (width vs. height) aspect ratio. When such video content is displayed in a 640×480 landscape window, it uses 100% of the window, as shown in FIG. 11C. However, when such video content is displayed in a 480×640 portrait window, it must be scaled down to a 480×360 image to fit the width of the window while maintaining its original aspect ratio, as shown in FIG. 11D. Displaying a 480×360 image in a 480×640 portrait window uses only 56.25% of the window, resulting in a loss of nearly half the available resolution.

Figure 11E:
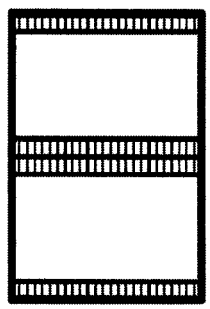
FIG. 11E is a diagram of a vertical screen divided into two landscape windows each displaying an image with a 16:9 aspect ratio.
Figure 11F:
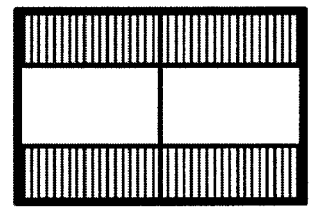
FIG. 11F is a diagram of a horizontal screen divided into two portrait windows each displaying an image with a 16:9 aspect ratio.

Newer television programs and video games (other than those specifically adapted for a smart phone or another portable device) generally have a 16:9 aspect ratio. When such video content is displayed in a 640×480 landscape window, it must be scaled down to a 640×364 image to maintain its original aspect ratio, and thus uses 75.84% of the window, as shown in FIG. 11E. However, when such video content is displayed in a 480×640 portrait window, it must be scaled down to a 480×270 image to fit the width of the window while maintaining its original aspect ratio, and thus uses only 42.19% of the window, as shown in FIG. 11F.

Figure 11G:
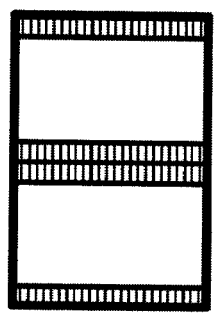
FIG. 11G is a diagram of a vertical screen divided into two landscape windows each displaying an image with a 1.85:1 aspect ratio.
Figure 11H:
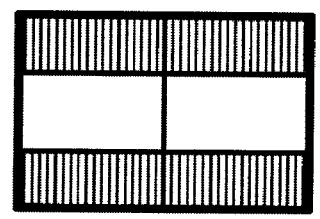
FIG. 11H is a diagram of a horizontal screen divided into two portrait windows each displaying an image with a 1.85:1 aspect ratio.

Many movies have a 1.85:1 aspect ratio. When such video content is displayed in a 640×480 landscape window, it must be scaled down to a 640×346 image to maintain its original aspect ratio, and thus uses 72.07% of the window, as shown in FIG. 11G. However, when such video content is displayed in a 480×640 portrait window, it must be scaled down to a 480×259 image to fit the width of the window while maintaining its original aspect ratio, and thus uses only 40.54% of the window, as shown in FIG. 11H.

Figure 11I:
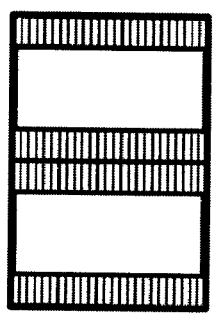
FIG. 11I is a diagram of a vertical screen divided into two landscape windows each displaying an image with a 2.35:1 aspect ratio.
Figure 11J:
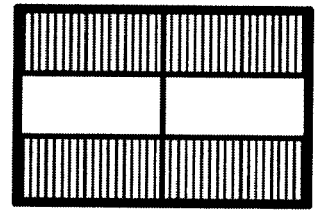
FIG. 11J is a diagram of a horizontal screen divided into two portrait windows each displaying an image with a 2.35:1 aspect ratio.

Most wide screen movies have a 2.35:1 aspect ratio. When such video content is displayed in a 640×480 landscape window, it must be scaled down to a 640×272 image to maintain its original aspect ratio, and thus uses 56.74% of the window, as shown in FIG. 11I. However, when such video content is displayed in a 480×640 portrait window, it must be scaled down to a 480×204 image to fit the width of the window while maintaining its original aspect ratio, and thus uses only 31.91% of the window, as shown in FIG. 11J.

The above disclosure provides examples and aspects relating to various embodiments within the scope of claims, appended hereto or later added in accordance with applicable law. However, these examples are not limiting as to how any disclosed aspect may be implemented, as those of ordinary skill can apply these disclosures to particular situations in a variety of ways.

I claim:

1. A stereoscopic 3D viewer for viewing a stereoscopically complementary first and second image comprising:
    a holder in which an object capable of displaying the stereoscopically complementary first and second image can be placed, wherein one image is over the other image,
    a first eye hole for a user's first eye,
    a second eye hole for a user's second eye,
    a first path for transmitting the first image to the user's first eye, the first optical path further comprising a first rear mirror facing the holder and a first front mirror facing the first eye hole,
    a second path for transmitting the second image to the user's second eye, the second optical path further comprising a second rear mirror facing the holder and a second front mirror facing the second eye hole,
    wherein the first front mirror is positioned to block the first image from being seen by the user's second eye and the second front mirror is positioned to block the second image from being seen by the user's first eye.

2. The stereoscopic 3D view of claim 1, wherein the first rear mirror also faces the first front mirror and the second rear mirror also faces the second front mirror.

3. The stereoscopic 3D view of claim 2, wherein the first rear mirror, the first front mirror, the second rear mirror and the second front mirror are all arranged at compound angles.

4. The stereoscopic 3D viewer of claim 1, further comprising a first lens inserted within the first eye hole and a second lens inserted within the second eye hole.

5. The stereoscopic 3D viewer of claim 4, wherein the first lens and the second lens are both aligned with a border between the first-eye image and the second-eye image.

6. A stereoscopic 3D viewer for viewing a stereoscopically complementary pair of images comprising:
    a holder in which an object capable of displaying the stereoscopically complementary pair of images can be placed,
    a eye hole for a user's left eye,
    a right eye hole for the user's right eye,
    a left optical path for transmitting a left-eye image of the stereoscopically complementary pair of images to the user's left eye, the left optical path further comprising a left rear mirror facing the holder and a left front mirror facing the left eye hole,
    a right optical path for transmitting a right-eye image of the stereoscopically complementary pair of images to the user's right eye, the right optical path further comprising a right rear mirror facing the holder and a right front mirror facing the right eye hole,
    wherein a section of the left optical path extending between the left front mirror and the left eye hole is substantially parallel to a section of the right optical path extending between the right front mirror and the right eye hole,
    wherein the left optical path further comprises a left front baffle intersecting the section of the left optical path extending between the left front mirror and the left eye hole, and the right optical path further comprises a right front baffle intersecting the section of the right optical path extending between the right front mirror and the right eye hole.

7. The stereoscopic 3D view of claim 6, wherein the front baffle and the right front baffle each has an aperture.

8. The stereoscopic 3D view of claim 7, wherein the aperture of the left front baffle matches a cross-section of the left optical path where the left front baffle intersects the left optical path, and the aperture of the right front baffle matches a cross-section of the right optical path where the right front baffle intersects the right optical path.

9. The stereoscopic 3D view of claim 7, wherein the aperture of the left front baffle is larger than a cross-section of the left optical path, and the aperture of the right front baffle is larger than a cross-section of the right optical path where the right front baffle intersects the right optical path.

10. The stereoscopic 3D view of claim 7, wherein the front baffle is movable along a central axis of the section of the left optical path extending between the left front mirror and the left eye hole, and the right front baffle is movable along a central axis of the section of the right optical path extending between the right front mirror and the right eye hole.

11. The stereoscopic 3D view of claim 7, wherein the front baffle is provided with one or more movable slats for adjusting the size of the aperture in the left front baffle and the right front baffle is provided with one or more movable slats for adjusting the size of the aperture in the right front baffle.

12. The stereoscopic 3D view of claim 7, further comprising a rear baffle intersecting the section of the left optical path extending between the holder and the left rear mirror and the section of the right optical path extending between the holder and the right rear mirror.

13. A stereoscopic 3D viewer for viewing a stereoscopically complementary pair of images comprising:
    a holder in which an object capable of displaying the stereoscopically complementary pair of images can be placed,
    a left eye hole for a user's left eye,
    a right eye hole for the user's right eye,
    a left optical path for transmitting a left-eye image of the stereoscopically complementary pair of images to the user's left eye, the left optical path further comprising a left rear mirror facing the holder and a left front mirror facing the left eye hole,
    a right optical path for transmitting a right-eye image of the stereoscopically complementary pair of images to the user's right eye, the right optical path further comprising a right rear mirror facing the holder and a right front mirror facing the right eye hole, wherein a section of the left optical path extending between the left front mirror and the left eye hole is substantially parallel to a section of the right optical path extending between the right front mirror and the right eye hole, further comprising a rear baffle intersecting the section of the left optical path extending between the holder and the left rear mirror and the section of the right optical path extending between the holder and the right rear mirror.

* * * * *